U S010462358B2

(12) United States Patent
Otani

(10) Patent No.: US 10,462,358 B2
(45) Date of Patent: Oct. 29, 2019

(54) INFORMATION PROCESSING APPARATUS, INFORMATION PROCESSING SYSTEM, AND INFORMATION PROCESSING METHOD

(71) Applicant: SONY CORPORATION, Tokyo (JP)

(72) Inventor: Takahide Otani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 185 days.

(21) Appl. No.: 15/314,962

(22) PCT Filed: Apr. 28, 2015

(86) PCT No.: PCT/JP2015/002276
§ 371 (c)(1),
(2) Date: Nov. 30, 2016

(87) PCT Pub. No.: WO2015/194084
PCT Pub. Date: Dec. 23, 2015

(65) Prior Publication Data
US 2017/0201677 A1 Jul. 13, 2017

(30) Foreign Application Priority Data

Jun. 20, 2014 (JP) ................................. 2014-127466

(51) Int. Cl.
H04N 5/232 (2006.01)
H04N 5/247 (2006.01)
(Continued)

(52) U.S. Cl.
CPC ......... *H04N 5/23222* (2013.01); *G06T 5/006* (2013.01); *H04N 5/23219* (2013.01);
(Continued)

(58) Field of Classification Search
CPC ............. H04N 5/23219; H04N 5/2621; H04N 13/0484; G06T 5/006; G06F 3/013
(Continued)

(56) References Cited

U.S. PATENT DOCUMENTS 7,636,236 B1 * 12/2009 Nana ..................... G06F 1/1616
248/920
8,254,633 B1 * 8/2012 Moon ................ G06K 9/00771
382/103
(Continued)

FOREIGN PATENT DOCUMENTS

JP 2001-067459 A 3/2001
JP 2004-159061 A 6/2004
(Continued)

*Primary Examiner* — Xi Wang
(74) *Attorney, Agent, or Firm* — Chip Law Group

(57) ABSTRACT

This information processing apparatus includes a control unit that acquires two images including a face of a user as an object, the two images being picked up from different positions in a vertical direction of the face of the user, determines whether or not each face in the two images is a face of the same person, and operates a mode in which on the basis of an image of an eye part in one of the two images, a line-of-sight correction image obtained by modifying an image of an eye part of the other of the two images is generated when each face in the two images is the face of the same person.

13 Claims, 18 Drawing Sheets

(51) Int. Cl.
    *H04N 5/262*  (2006.01)
    *H04N 5/272*  (2006.01)
    *G06T 5/00*   (2006.01)
(52) U.S. Cl.
    CPC ......... *H04N 5/23229* (2013.01); *H04N 5/247* (2013.01); *H04N 5/2621* (2013.01); *H04N 5/272* (2013.01); *G06T 2207/20216* (2013.01); *G06T 2207/30201* (2013.01)
(58) Field of Classification Search
    USPC .................. 396/51; 348/14.16, 14.08, 14.09
    See application file for complete search history.

(56)  References Cited

U.S. PATENT DOCUMENTS

| | | | | |
|---|---|---|---|---|
| 2003/0197779 | A1* | 10/2003 | Zhang | H04N 7/144 |
| | | | | 348/14.16 |
| 2005/0237424 | A1* | 10/2005 | Weekamp | H04M 1/0264 |
| | | | | 348/373 |
| 2010/0066840 | A1* | 3/2010 | Asukai | G06T 5/50 |
| | | | | 348/207.1 |
| 2014/0016871 | A1* | 1/2014 | Son | G06K 9/46 |
| | | | | 382/201 |
| 2014/0098259 | A1* | 4/2014 | Song | H04N 1/387 |
| | | | | 348/231.6 |
| 2014/0185957 | A1* | 7/2014 | Kim | H04N 5/2628 |
| | | | | 382/283 |

FOREIGN PATENT DOCUMENTS

| | | |
|---|---|---|
| JP | 2009-267791 A | 11/2009 |
| JP | 2012-114557 A | 6/2012 |
| JP | 2013-141104 A | 7/2013 |

\* cited by examiner

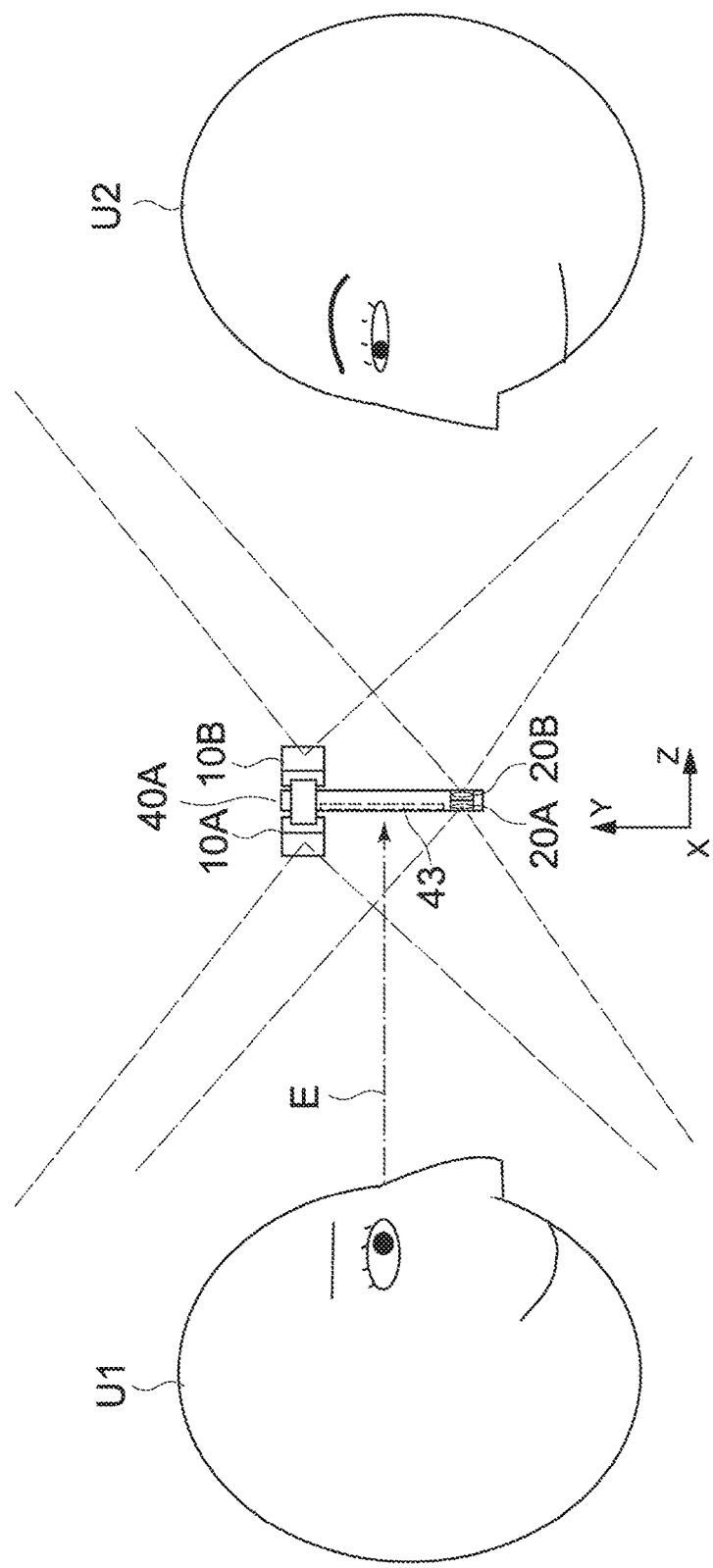

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2015/002276 filed on Apr. 28, 2015, which claims priority benefit of Japanese Patent Application No. JP 2014-127466 filed in the Japan Patent Office on Jun. 20, 2014. Each of the above-referenced applications is hereby incorporated herein by reference in its entirety.

TECHNICAL FIELD

The present technology relates to an information processing apparatus, an information processing system, and an information processing method that have a function of processing a face image of a user picked up by a camera.

BACKGROUND ART

Examples of ways to have fun with a portable terminal such as a mobile phone and a smartphone include taking a selfie. Specifically, many portable terminals include a camera mounted thereon, and are capable of displaying, on a screen of a display in real time, an image picked up by the camera. Accordingly, a user can easily take an image of his/her face with a desired expression while checking his/her face with the screen of the display.

The camera is usually located at a position away from the position of the screen of the display. Therefore, the line of sight of the user in an image of the user's face taken by the user while viewing the screen of the display is slightly displaced.

A technology that modifies line-of-sight displacement of the user as an object by correction has been known (see, for example, Patent Document 2). In this technology disclosed in Patent Document 2, the amount of line-of-sight displacement is calculated on the basis of the amount of displacement between the center of the black eye of the user calculated from a registered looking-at-camera image and the center of the black eye in an image obtained by modifying the display position of the face in the face images of the user picked up by an upper camera and a lower camera, in a camera phone. On the basis of the amount of line-of-sight displacement, an image in which the line of sight is modified so that the user looks at the camera is generated.

Patent Document 1: Japanese Patent Application Laid-open No. 2012-114557 (paragraph [0051])

SUMMARY

Problem to be Solved

In the case where a camera incorporated in a portable terminal such as a smartphone is used to take an image of one's own face, an image of a face in which the line of sight is displaced in a similar direction to the same degree tends to be taken. Some users attempt to take an image with various expressions for taking their best shot. However, it is still insufficient to satisfactory take a substantially looking-at-camera selfie, e.g., the variation in the expressions of the looking-at-camera face, whose image can be taken, is limited because of the above-mentioned limitation.

In view of the circumstances as described above, it is an object of the present technology to provide an information processing apparatus, an information processing system, an information processing method, and a program that are capable of satisfactory taking a substantially looking-at-camera selfie.

Means for Solving the Problem

In order to solve the above-mentioned problem, an information processing apparatus according to a first embodiment of the present technology includes a control unit that determines, on the basis of two images including a face of a person, whether or not each face in the two images is a face of the same person, the two images being picked up from different positions, and generates, on the basis of an image of an eye part in one of the two images, a line-of-sight correction image obtained by modifying an image of an eye part of the other of the two images when each face in the two images is the face of the same person.

In the information processing apparatus according to the first embodiment, the control unit may be configured to acquire two images including a face of a user as the object, the two images being picked up from different positions in a vertical direction of the face of the user by a first imaging unit and a second imaging unit.

In the information processing apparatus according to the first embodiment, the control unit may be configured to determine, in a mode in which the line-of-sight correction image is generated, whether or not a direction in which the first imaging unit and the second imaging unit are arranged is right with respect to horizontal and vertical orientations of the face of the user as the object, and to output an alert when the direction is wrong.

In the information processing apparatus according to the first embodiment, the control unit may be configured to output, as the alert, information for leading to correction of the direction in which the first imaging unit and the second imaging unit are arranged.

In the information processing apparatus according to the first embodiment, the first imaging unit may be an upper imaging unit in the vertical direction of the face of the user as the object, and the second imaging unit may be a lower imaging unit in the vertical direction of the face of the user as the object, and image quality of an image picked up by the first imaging unit may be higher than that of the second imaging unit.

In the information processing apparatus according to the first embodiment, the control unit may be configured to determine whether or not a vertical positional relationship between the first imaging unit and the second imaging unit in the vertical direction of the face of the user as the object is right in a mode in which the line-of-sight correction image is generated, and to output an alert when the vertical positional relationship is wrong.

In the information processing apparatus according to the first embodiment, the control unit may be configured to output, as the alert, information for leading to correction of the vertical positional relationship between the first imaging unit and the second imaging unit.

In the information processing apparatus according to the first embodiment, the first imaging unit may be incorporated in the information processing apparatus, and the second imaging unit may be a separate imaging unit detachably mounted on the information processing apparatus.

In the information processing apparatus according to the first embodiment, the control unit may be configured to edit the generated line-of-sight correction image.

An information processing apparatus according to a second embodiment of the present technology includes an imaging unit that picks up an image of a face of a person from different positions; and a control unit that determines, on the basis of two images including a face of the user, whether or not each face in the two images is a face of the same person, the two images being picked up by the imaging unit, and generates, on the basis of an image of an eye part in one of the two images, a line-of-sight correction image obtained by modifying an image of an eye part of the other of the two images when each face in the two images is the face of the same person.

An information processing method according to a third embodiment of the present technology includes, by a control unit, determining, on the basis of two images including a face of the user, whether or not each face in the two images is a face of the same person, the two images being picked up by the imaging unit, and generating, on the basis of an image of an eye part in one of the two images, a line-of-sight correction image obtained by modifying an image of an eye part of the other of the two images when each face in the two images is the face of the same person.

An information processing system according to a fourth embodiment of the present technology includes a control unit that determines, on the basis of two images including a face of a person, whether or not each face in the two images is a face of the same person, the two images being picked up from different positions, and generates, on the basis of an image of an eye part in one of the two images, a line-of-sight correction image obtained by modifying an image of an eye part of the other of the two images when each face in the two images is the face of the same person.

A program according to a fifth embodiment of the present technology causes a computer to function as a control unit that determines, on the basis of two images including a face of a person, whether or not each face in the two images is a face of the same person, the two images being picked up from different positions, and generates, on the basis of an image of an eye part in one of the two images, a line-of-sight correction image obtained by modifying an image of an eye part of the other of the two images when each face in the two images is the face of the same person.

Effects

As described above, according to the present technology, it is possible to satisfactory take a substantially looking-at-camera selfie.

Note that this effect is not limited as the effect of the present technology, and the effects of the present technology may be any effect described in the present disclosure.

BRIEF DESCRIPTION OF DRAWINGS

FIG. 22 A diagram describing a modified example in which four cameras are used.

DESCRIPTION OF PREFERRED EMBODIMENTS

Hereinafter, embodiments of the present technology will be described with reference to the drawings.

<First Embodiment>

[Overall Configuration of Face Image Processing System]

Figure 1:
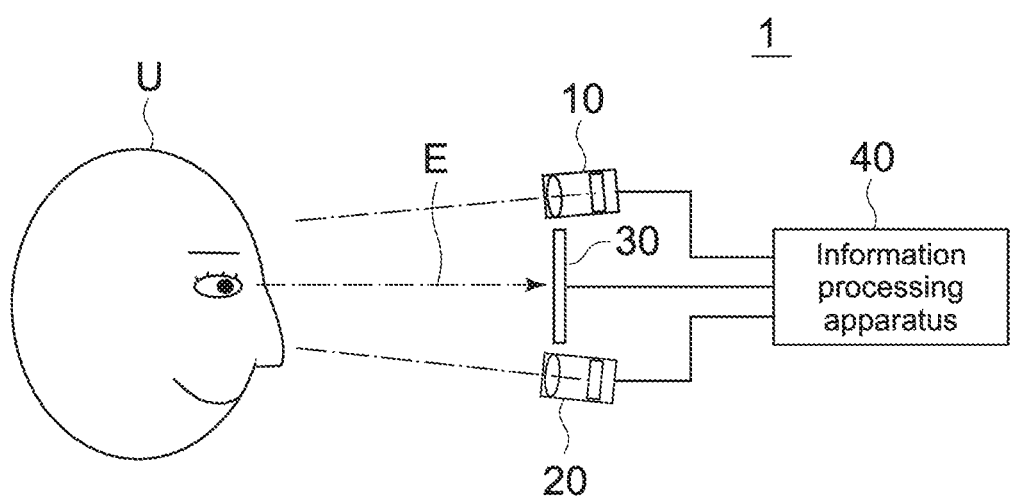
FIG. 1 A diagram showing the overall configuration of a face image processing system according to a first embodiment of the present technology.

FIG. 1 is a diagram showing the overall configuration of a face image processing system according to a first embodiment of the present technology.

This face image processing system 1 includes two camera apparatuses 10 and 20 (imaging unit), a line-of-sight target object 30 serving as a target at which a user U looks at the time of taking an image, and an information processing apparatus 40.

The line-of-sight target object 30 may be, more specifically, a screen of a display that displays an image of the face of the user U picked up by at least one of the two camera apparatuses 10 and 20, for example. It should be noted that the line-of-sight target object 30 does not necessarily need to be the screen of the display. The line-of-sight target object 30 may be, for example, a mirror. Alternatively, the line-of-sight target object 30 may be an object with some kind of mark that guides a line of sight E of the user U. Note that in the configuration of the present technology, the line-of-sight target object 30 is not essential.

The two camera apparatuses 10 and 20 are arranged so that images of the face of the user U can be picked up from two positions different in a vertical direction of the face of the user U. Specifically, the two camera apparatuses 10 and 20 are arranged so that the camera apparatus 10 picks up an image of the face of the user U from a relatively upper position in the vertical direction, and the camera apparatus 20 picks up an image of the face of the user U from a relatively lower position in the vertical direction. More specifically, for example, the two camera apparatuses 10 and 20 are arranged so that images of the face of the user U whose line of sight E corresponds to the line-of-sight target object 30 can be picked up from a height position slightly upwardly displaced from the height position of the line of sight E of the user U and a height position slightly downwardly displaced from the height position of the line of sight E of the user U. In the case where the direction of the line of sight E of the user U is right in front, when an image of the face of the user U is picked up by the camera apparatus 10 from a position slightly higher than the position of the line of sight E, the entire face of the user U in the picked-up image slightly looks down including the line of sight E. On the other hand, when an image of the face of the user U is picked up by the camera apparatus 20 from a position slightly lower than the position of the line of sight E, the entire face of the user U in the picked-up image slightly looks up including the line of sight E.

In the following description, the camera apparatus 10 that picks up an image of the face of the user U from a position slightly higher than the position of the line of sight E is referred to as "upper camera apparatus 10," and the camera apparatus 20 that picks up an image of the face of the user U from a position slightly lower than the position of the line of sight E is referred to as "lower camera apparatus 20" in the specification.

The camera apparatuses 10 and 20 each include an imaging lens, an image sensor, a development processing unit that develops the output of the image sensor, and a controller. The camera apparatuses 10 and 20 each may be a camera mounted on an enclosure 41 (see FIG. 4) of the information processing apparatus 40 as an imaging unit. Alternatively, one of the camera apparatuses 10 and 20 may be a camera incorporated in the information processing apparatus 40, and the other may be a camera attachable/detachable to/from the information processing apparatus 40 or a camera arranged independent of the information processing apparatus. Alternatively, the camera apparatuses 10 and 20 each may be a camera placed independent of the information processing apparatus 40.

The more specific configuration of the camera apparatuses 10 and 20 will be described in the second embodiment.

The information processing apparatus 40 includes a communication interface for communicating with the two camera apparatuses 10 and 20 by wired or wireless means, a CPU (Central Processing Unit), a memory, storage, an input unit for a user, and the like. The CPU of the information processing apparatus 40 controls the two camera apparatuses connected via the communication interface, and performs, for example, composition processing of two images picked up by the two camera apparatuses 10 and 20.

Note that the information processing apparatus 40 may specifically be, for example, a smartphone, a personal computer, or a server apparatus connected to the two camera apparatuses 10 and 20 through a network.

The more specific configuration of the information processing apparatus 40 will be described in the second embodiment.

[Line-of-Sight Correction by Image Composition]

The information processing apparatus 40 in the above-mentioned face image processing system 1 is capable of performing line-of-sight correction as one of image composition processing.

The line-of-sight correction is as follows.

Here, the line-of-sight correction in the case where a smartphone is used as the information processing apparatus 40 will be described. For example, when a user takes an image of his/her face with a camera incorporated in the smartphone, the user operates a shutter button at an arbitrary timing while checking his/her face displayed in real time on a screen of a display serving as a line-of-sight target object. As a result, at the time, the picked-up (displayed) image is cut out as a still image, and stored in storage or the like. In many smartphones, the camera is arranged at a position away from the position at which the screen of the display is arranged on the front surface of the enclosure, e.g., position upper than the position of the screen of the display when viewed from the user. Therefore, when the user takes an image of his/her face, the entire face in the picked-up image of his/her face slightly looks down including the direction of the line of sight.

In general, it is said that a person who slightly looks up looks positive and the eyes of the person look impressive. When a camera is arranged at a position lower than the position of the screen of the display when viewed from the user, an image of the face of the user whose line of sight is directed upward can be picked up. However, in this case, because an image in which the entire face slightly looks up is obtained, the upward line of sight is less likely to stand out.

Note that according to various needs of users, an image of the face of the user whose line of sight is directed downward may be desired to be picked up instead of an image of the face of the user whose line of sight is directed upward. Also in this case, only by picking up an image of the face of the user by a camera arranged at a position slightly upper than the position of the screen of the display when viewed from the user, an image in which the entire face slightly looks down is obtained, and the downward line of sight does not stand out.

As described above, in an environment in which the user takes a face image of the user by a camera arranged at a position upper or lower than the position of the line-of-sight target object 30 while viewing the line-of-sight target object 30, it is still insufficient to satisfactory take a substantially looking-at-camera selfie, e.g., the variation in the expressions of the looking-at-camera face, whose image can be taken, is limited because an image of the face in which the line of sight is displaced in a similar direction to the same degree tends to be taken.

The face image processing system 1 according to the first embodiment of the present technology intends to solve such problems. It should be noted that the problem to be solved by the present technology is not limited thereto.

[Line-of-Sight Correction Performed in Face Image Processing System]

Next, the outline of a line-of-sight correction operation performed in the face image processing system 1 according to this embodiment will be described.

(1) The CPU (control unit) of the information processing apparatus 40 performs, in accordance with an application program stored in the memory, control as follows.

In FIG. 1, first, the CPU of the information processing apparatus 40 causes the two camera apparatuses 10 and 20 to start imaging. In the two camera apparatuses 10 and 20, the upper camera apparatus 10 is placed so that an image of the face of the user U is picked up from a position slightly higher than the position of the line of sight E, and the lower camera apparatus 20 is placed so that an image of the face of the user U is picked up from a position slightly lower than the position of the line of sight E.

(2) Assumption is made that the line of sight E of the user U at the time of taking an image corresponds to the line-of-sight target object 30 arranged between the two camera apparatuses 10 and 20, e.g., screen of a display. On the screen of the display, for example, an image of his/her face being picked up by the upper camera apparatus 10 or the lower camera apparatus 20 is displayed as a moving image. Alternatively, moving images picked up by the two camera apparatuses 10 and 20 may be simultaneously displayed.

(3) The user U operates the input unit of the information processing apparatus 40 to input an instruction of capturing a still image at an arbitrary timing while checking the moving image of his/her face via the screen of the display.

(4) When receiving the instruction of capturing a still image from the user U, the CPU of the information processing apparatus 40 supplies a control command for instructing capturing of a still image to the two camera apparatuses 10 and 20.

(5) The two camera apparatuses each cut out a still image from the moving image of the face of the user U in response to this control command, and transmit it to the information processing apparatus 40.

Figure 2:
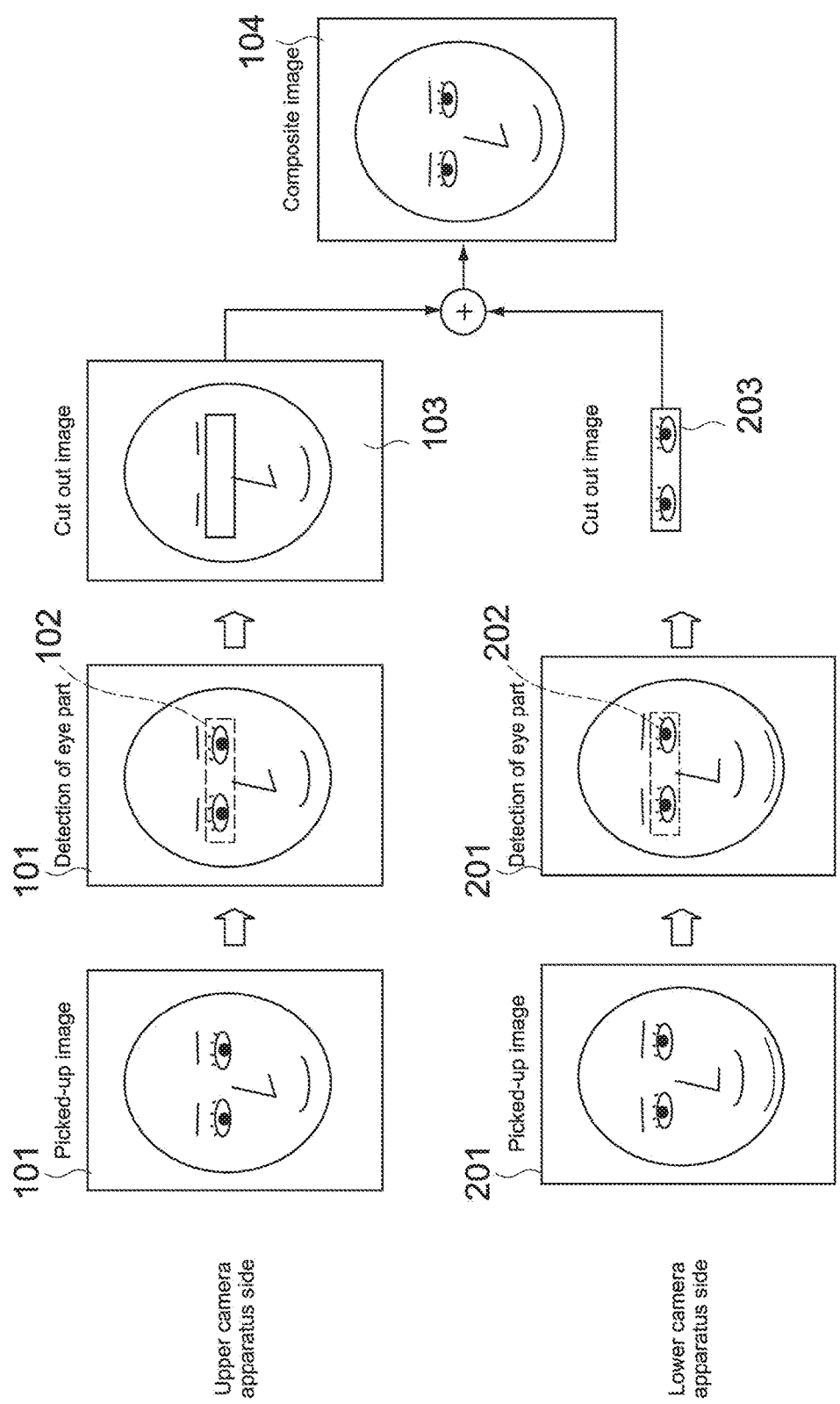
FIG. 2 A diagram showing, on the basis of images, an operation to acquire a composite image on which line-of-sight correction has been performed from face images of a user U picked up by two camera apparatuses 10 and 20 in the face image processing system shown in FIG. 1.

FIG. 2 is a diagram showing, on the basis of images, an operation to acquire a composite image on which line-of-sight correction has been performed from face images of the user U picked up by the two camera apparatuses 10 and 20.

A reference symbol 101 represents a face image (still image) picked up by the upper camera apparatus 10, and a reference symbol 201 represents a face image (still image) picked up by the lower camera apparatus 20. The face of the user U in the face image 101 picked up by the upper camera apparatus 10 slightly looks down including the line of sight, and the face of the user in the face image 201 picked up by the lower camera apparatus 20 slightly looks up including the line of sight.

(6) The CPU of the information processing apparatus 40 detects images of an eye part 102 and 202 from the face images 101 and 201 picked up by the two camera apparatuses 10 and 20, respectively. Here, the images of an eye part 102 and 202 in the face images are detected by, for example, using characteristic data of an image of an eye part acquired by analyzing face images of many people with a statistical learning method.

Note that in the case where the CPU of the information processing apparatus 40 has failed to detect an image of an eye part due to focus displacement or the like, the CPU notifies the user U of an error with display, sound, or the like.

(7) The CPU of the information processing apparatus 40 cuts out, as an image for line-of-sight correction 203, the image of an eye part 202 detected in the face image 201 picked up by the lower camera apparatus 20. Here, the image for line-of-sight correction 203 is, for example, an image of a rectangular range including both eyes.

(8) The CPU of the information processing apparatus 40 generates a line-of-sight correction image obtained by replacing the image of an eye part 102 detected in the face image 101 picked up by the upper camera apparatus 10 with the image for line-of-sight correction 203. Specifically, the image for line-of-sight correction 203 cut out from the face image 201 picked up by the lower camera apparatus 20 and an image 103 other than the image of an eye part 102 detected in the face image picked up by the upper camera apparatus 10 are added for each pixel. At this time, the CPU of the information processing apparatus 40 may perform composition processing such as alpha blending on a joint part of the images to make the joint part less stand out.

(9) In this way, a composite image 104 obtained by replacing the image of an eye part 102 of the face image of the user U who slightly looks down picked up by the upper camera apparatus 10 with the image 203 of an eye part of the face image of the user U who slightly looks up picked up by the lower camera apparatus 20 is acquired. In the specification, such image composition is referred to as "upward line-of-sight correction" as necessary.

Alternatively, it is possible to perform the following line-of-sight correction.

Figure 3:
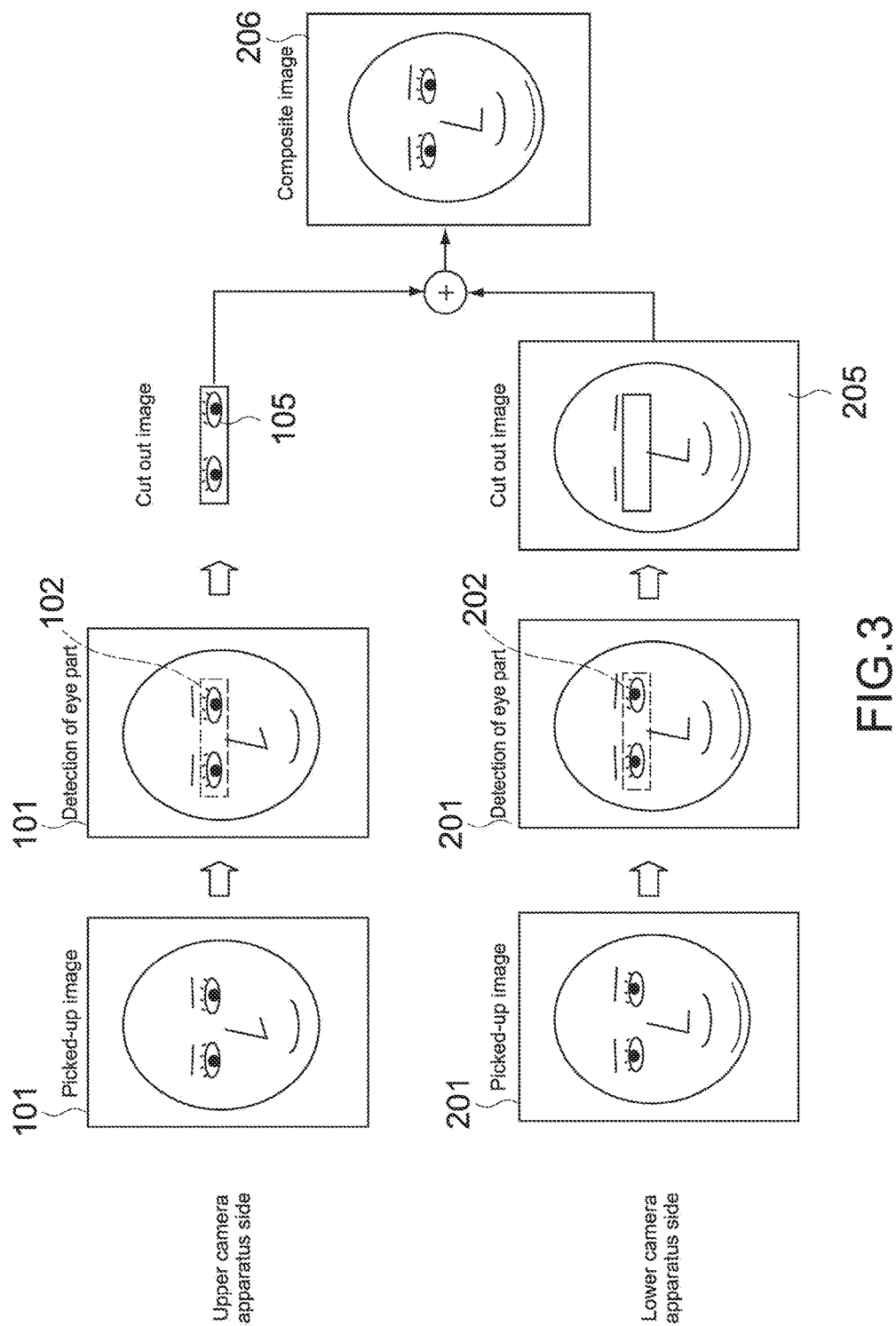
FIG. 3 A diagram showing, on the basis of images, another operation to acquire a composite image on which line-of-sight correction has been performed from face images of the user U picked up by the two camera apparatuses 10 and 20 in the face image processing system shown in FIG. 1.

As shown in FIG. 3, (7A) The CPU of the information processing apparatus 40 cuts out, as an image for line-of-sight correction 105, the image of an eye part 102 detected in the face image 101 picked up by the upper camera apparatus 10.

(8A) The CPU of the information processing apparatus 40 performs image composition in which the image of an eye part 202 detected in the face image 201 picked up by the lower camera apparatus 20 is replaced with the image for line-of-sight correction 105. Specifically, the image for line-of-sight correction 105 cut out from the face image 101 picked up by the upper camera apparatus 10 and an image 205 other than the image of an eye part 202 detected in the face image picked up by the lower camera apparatus 20 are added for each pixel.

(9A) In this way, a composite image 206 obtained by replacing the image of an eye part 102 of the face image of the user U who slightly looks up picked up by the lower camera apparatus 20 with the image 105 of an eye part of the face image of the user U who slightly looks down picked up by the upper camera apparatus 10 is acquired. In the specification, such image composition is referred to as "downward line-of-sight correction" as necessary.

[Regarding Specification of Two Camera Apparatuses 10 and 20]

In the case where the two camera apparatuses 10 and 20 differ in the specification, which affects the degree of image quality thereof, the specification of the camera apparatus that picks up an image that occupies a larger range in the composite image than the other image is desired to be higher than that of the other camera apparatus. Here, examples of the specification that affects the degree of image quality include the size of the image sensor and the lens characteristics. It goes without saying that the specification that affects the degree of image quality is not limited thereto.

For example, in the above-mentioned upward line-of-sight correction, the image 103 other than the eye part in the face image 101 picked up by the upper camera apparatus 10 is used for composition. Therefore, the specification of the upper camera apparatus 10 is desired to be higher than that of the lower camera apparatus 20 for improving the overall image quality.

On the other hand, in the downward line-of-sight correction, the image 205 other than the eye part in the face image 201 picked up by the lower camera apparatus 20 is used for composition. Therefore, the specification of the lower camera apparatus 20 is desired to be higher than that of the upper camera apparatus 10 for improving the overall image quality.

[Tuning of Image Tone of Face Images Picked Up by Two Camera Apparatuses 10 and 20]

In the case where the two camera apparatuses 10 and 20 differ in the value of imaging parameters, which affect the image tone and are used at the time of taking an image, such as exposure, white balance, tint, contrast, and sharpness, the image tone is unnaturally different between in the eye area and the other area, and it may be recognized at a glance that the resulting image is a composite image.

In the face image processing system 1 according to this embodiment, the CPU of the information processing apparatus 40 compares the imaging parameter values of the two camera apparatus 10 and 20 with each other before image pickup, and matches, by signal processing, the image tone of an image picked up by at least one of the camera apparatuses with the image tone of an image picked up by the other camera apparatus when the difference between the imaging parameter values causes the image tone of the images to be different.

For example, when there is a difference between the values of exposure, the CPU of the information processing apparatus 40 performs signal processing so that the brightness value of an image picked up by one camera apparatus is increased/decreased in the amount of the difference between the values of exposure set in the camera apparatuses. Similarly, also in the case where there is a difference between values of white balance, tint, contrast, sharpness, and the like, the difference of the image tone is reduced by performing signal processing on one of the images.

Accordingly, it is possible to match, as much as possible, the image tone between the images picked up by the two camera apparatuses 10 and 20, and suppress the unnatural difference of the image tone between the eye area and the other area in the composite face image.

Which image tone of the images picked up by the upper and lower camera apparatuses it is matched to may be uniquely determined or appropriately specified by the user.

Note that in order to reduce the total burden on the signal processing, it is desired to perform signal processing not on the entire face image acquired from the camera apparatus but only on an image to be composited.

Although a method of matching the image tone between two images by signal processing has been described here, it may be possible to match the imaging parameter values set in the camera apparatuses with each other to match, as much as possible, the image tone between the face images picked up by the two camera apparatuses 10 and 20.

Specifically, this method is achieved by changing the imaging parameter value of at least one of the camera apparatuses to the imaging parameter value of the other when the CPU of the information processing apparatus 40 compares the imaging parameter values of the two camera apparatuses 10 and 20 with each other before taking an image and the difference between the imaging parameter values causes the image tone of the images to be different. Alternatively, the imaging parameter values of the two camera apparatuses 10 and 20 may be matched to the intermediate value thereof.

As described above, in the face image processing system 1 in this embodiment, it is possible to acquire the composite image 104 obtained by replacing the image of an eye part 102 of the face image of the user U who slightly looks down picked up by the upper camera apparatus 10 with the image 203 of an eye part of the face image of the user U who slightly looks up picked up by the lower camera apparatus 20. Because only the orientation of the eye part is slightly upward while the orientation of the entire face is slightly downward in such a face image, the upward line of sight stands out as compared with an image in which the entire face looks slightly up and it is possible to acquire an impressive face image.

Further, in the face image processing system 1 according to this embodiment, it is possible to acquire the composite image 206 obtained by replacing the image of an eye part 102 of the face image of the user U who slightly looks up picked up by the lower camera apparatus 20 with the image 105 of an eye part of the face image of the user U who slightly looks down picked up by the upper camera apparatus 10. Because only the orientation of the eye part is slightly downward while the orientation of the entire face is slightly upward in such a face image, the downward line of sight stands out as compared with an image in which the entire face looks slightly down and it is possible to acquire a unique face image.

<Second Embodiment>

Next, the configuration of a face image processing system 1A according to a second embodiment of the present technology will be described.

Figure 4:
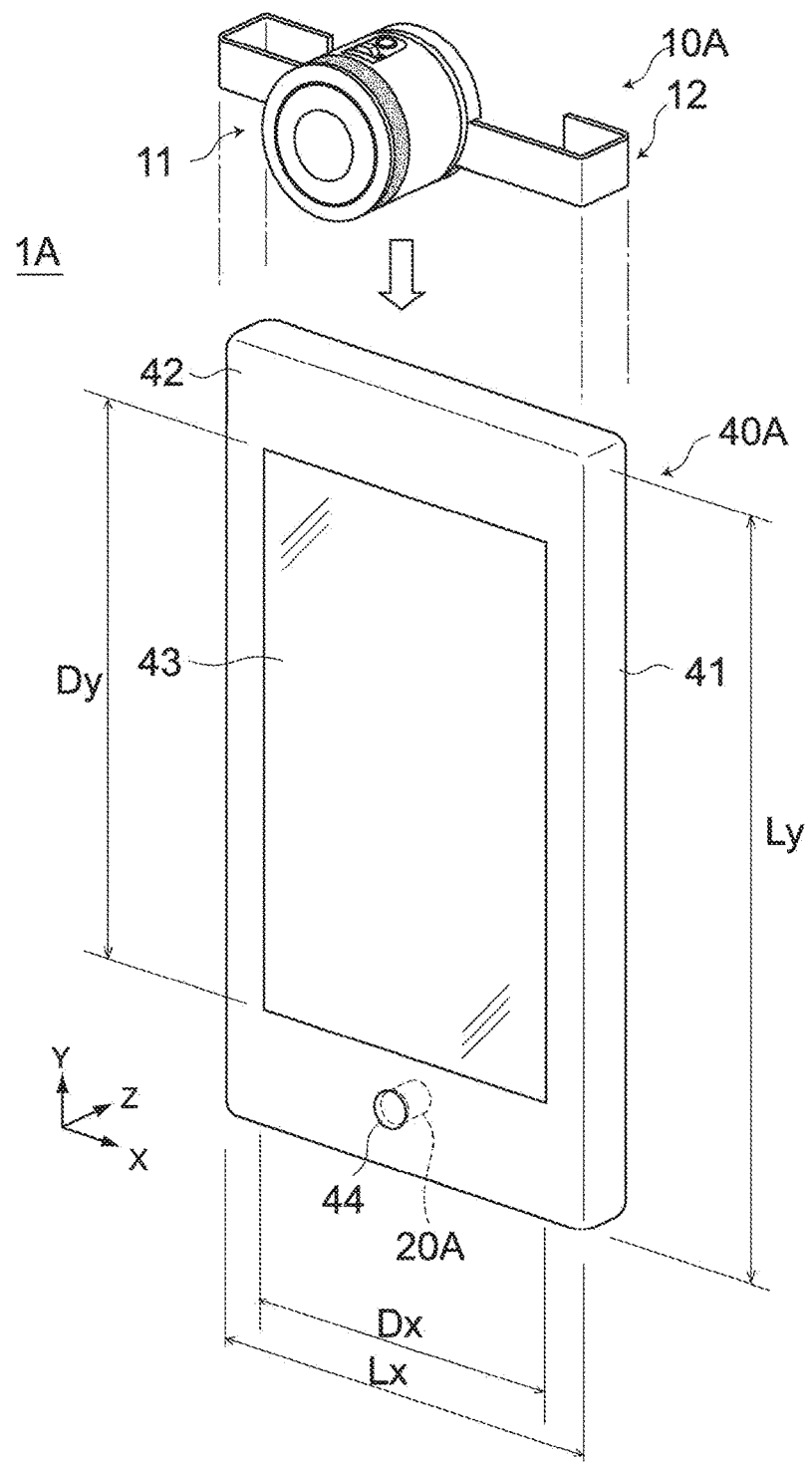
FIG. 4 A perspective view showing the configuration of a face image processing system 1A according to a second embodiment of the present technology.
Figure 5:
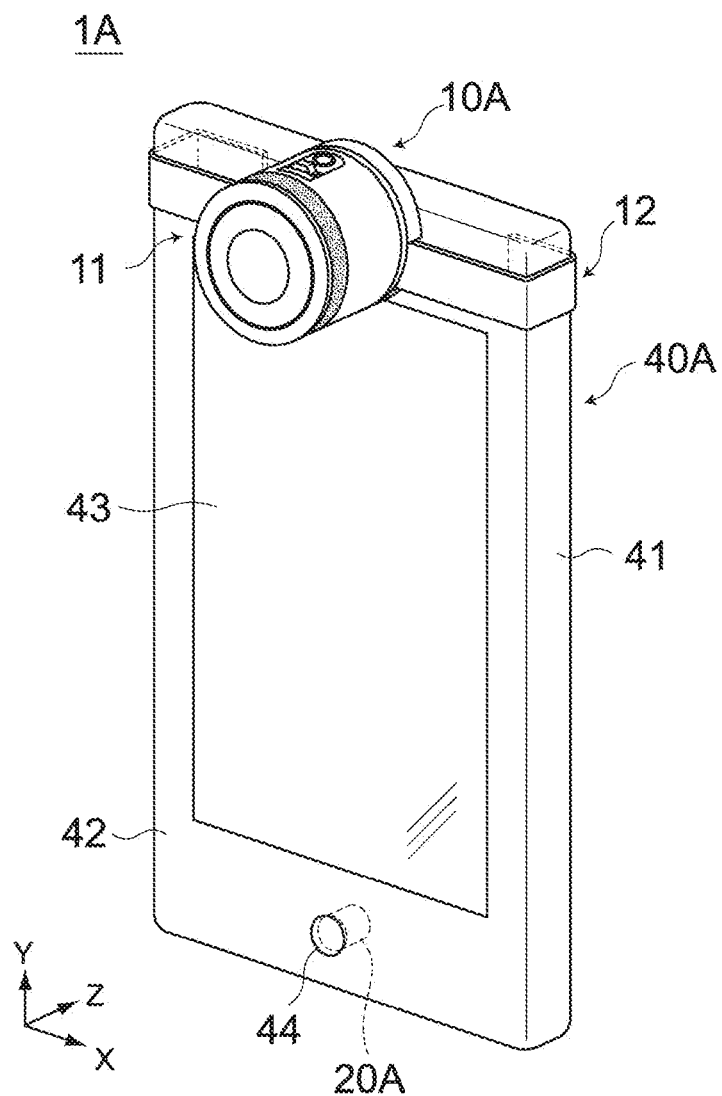
FIG. 5 A perspective view showing the state where an external camera 10A is attached to a portable terminal 40A in the face image processing system 1A shown in FIG. 4.

FIGS. 4 and 5 are each a perspective view showing the face image processing system 1A including a portable terminal 40A serving as a portable information processing apparatus provided with an incorporated camera 20A and a camera 10A detachably mounted on the portable terminal 40A. The camera 10A detachably mounted on the portable terminal 40A is referred to as "external camera 10A" in the specification. The incorporated camera 20A and the external camera 10A configure an imaging unit.

Note that FIG. 4 shows the state before the external camera 10A is mounted on the portable terminal 40A, and FIG. 5 shows the state where the external camera 10A has been mounted on the portable terminal 40A.

Here, the external camera 10A is used as the above-mentioned upper camera apparatus 10, and the incorporated camera 20A is used as the above-mentioned lower camera apparatus 20.

[Configuration of Portable Terminal 40A]

As shown in FIGS. 4 and 5, the portable terminal 40A includes the enclosure 41 with a size and shape that can be held in one hand of the user. The enclosure 41 has a plate-like rectangular parallelepiped shape including a front surface, a rear surface, and four side surfaces. On the front surface 42 of the enclosure 41, a screen of a display 43 including, for example, a liquid crystal panel or an organic EL panel, is arranged. On the screen of a display 43, a transparent touch sensor panel (illustration omitted) is arranged. The touch sensor panel includes, for example, an electrostatic capacity type touch sensor panel. The touch sensor panel generates a signal corresponding to the position touched by the user, generates coordinate information from this signal, and supplies it to the CPU.

As described above, the portable terminal 40A has the camera 20A therein. Hereinafter, the camera 20A will be referred to as "incorporated camera 20A" in the specification.

In the front surface 42 of the enclosure 41, a light transmission unit 44 for taking light in an imaging lens (not shown) of the incorporated camera 20A is provided. The light taken in through the imaging lens of the incorporated camera 20A is converted into an electrical signal by an image sensor such as a CMOS (Complementary Metal Oxide Semiconductor) and a CCD (Charge Coupled Device. This electrical signal is converted into digital data for each pixel by an A/D converter, and thus RAW data is obtained. The exposure, white balance, and the like in the RAW data are adjusted by a signal processing circuit in accordance with set parameters, and image data is generated through development processing.

The image data acquired by the incorporated camera 20A in this way is used as data for display by the CPU and the display control circuit in the portable terminal 40A, supplied to the display, and displayed on the screen of a display 43 as a moving image or a still image. The CPU stores the image data at timing instructed by the user in storage, a medium, or the like, as a still image. At this time, it may be converted into a particular image format such as JPEG (Joint Photographic Experts Group).

Next, the specific hardware configuration of the portable terminal 40A will be described.

Figure 6:
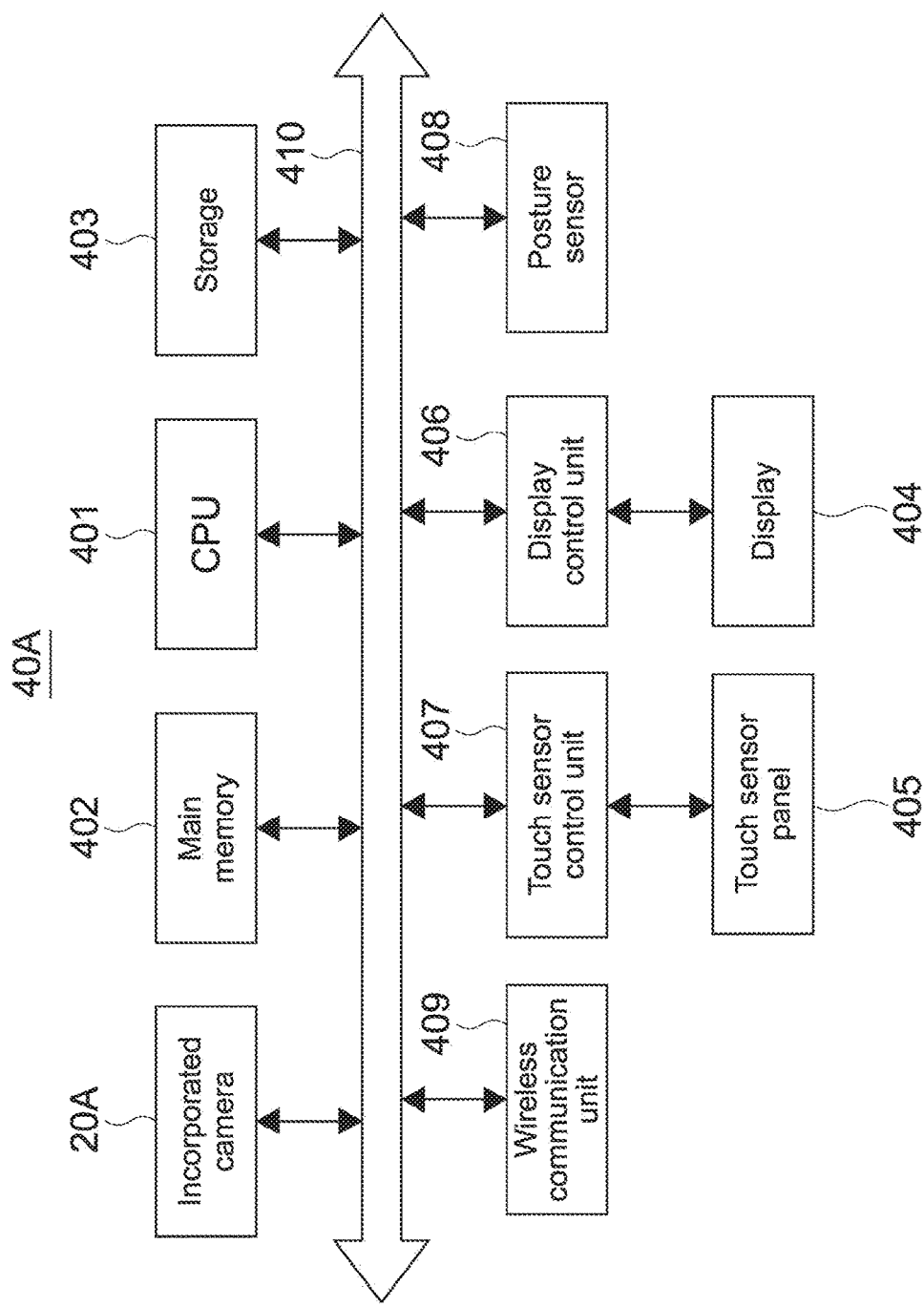
FIG. 6 A block diagram showing the hardware configuration of the portable terminal 40A.

FIG. 6 is a block diagram showing the hardware configuration of the portable terminal 40A. The hardware configuration of the portable terminal 40A is similar to that of the above-mentioned information processing apparatus 40 according to the first embodiment.

As shown in FIG. 6, the portable terminal 40A includes a CPU (control unit) 401, a main memory 402, a storage 403, the incorporated camera (lower camera apparatus) 20A, a display 404, a touch sensor panel 405, a display control unit 406, a touch sensor control unit 407, a posture sensor 408, a wireless communication unit 409, and a system bus 410.

The CPU 401 is a controller that controls the respective units of the portable terminal 40A and performs arithmetic processing for executing an application program by using the main memory 402 as work space.

The main memory 402 includes a RAM (Random Access Memory) and the like. In the main memory 402, an operating system, an application program executed on this operating system, various kinds of data necessary for the operation of this application program are stored.

The storage 403 includes, for example, a non-volatile memory such as a flash memory. In the storage 403, the operating system called by the main memory 402, various application programs, and files of various kinds of data such as image, audio, and document are stored.

As described above, the incorporated camera 20A is a camera incorporated in the portable terminal 40A. The incorporated camera 20A is controlled by the CPU 401 in accordance with the application program for camera. In accordance with the application program for camera, for example, the CPU 401 activates the incorporated camera 20A, sets various imaging conditions such as an imaging parameter and resolution, controls development processing, and performs control to display a moving image or a still image on the display 404 by supplying the developed image data to the display control unit 406. Further, in accordance with the application program for camera, the CPU 401 uses an image picked up by the incorporated camera 20A and an image picked up by the external camera 10A to perform image composition for the line-of-sight correction.

The display 404 includes, for example, a liquid crystal panel or an organic EL (electroluminescence) panel, and displays various operation screens of the portable terminal 40A, an image such as a still image and a moving image, and the content of other various files of documents and the like.

The display control unit 406 generates data for display corresponding to the specification of the display 404 regarding the above-mentioned various kinds of information.

The touch sensor panel 405 is a device that detects the coordinate of the position selected by the user on the screen of the display 404, as described above.

The touch sensor control unit 407 controls the touch sensor panel 405, generates coordinate data corresponding to the detected position, and supplies it to the CPU 401.

The posture sensor 408 is a sensor for detecting the posture of the portable terminal 40A, as described above. The posture sensor 408 includes, for example, an acceleration sensor that detects an acceleration in triaxial directions or a gyro sensor that detects an angular velocity.

The wireless communication unit 409 is an interface for performing communication via a wireless LAN (Local Area Network) such as WiFi (registered trademark) or near field communication such as NFC (Near Field Communication) and Blue Tooth (registered trademark) between the wireless communication unit 409 and an external apparatus (e.g., lower camera apparatus 20).

The system bus 410 is a transmission path for exchanging various signals between the above-mentioned blocks.

In the above, the main hardware configuration of the portable terminal 40A has been described. However, as other configurations, for example, a WWAN (Wireless Wide Area Network) communication unit, a speaker, a microphone, a memory card read/writer, a battery, a control circuit of the battery, a GPS (Global Positioning System) reception unit, and a terrestrial digital television reception unit may be mounted.

[Configuration of External Camera 10A]

Figure 7:
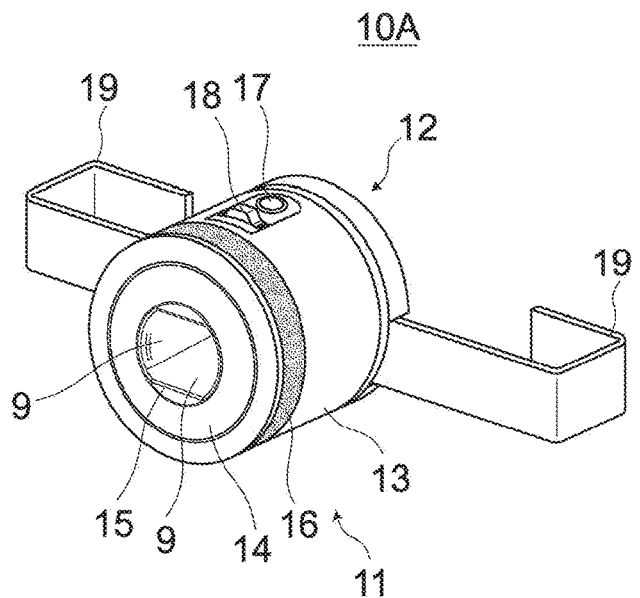
FIG. 7 A perspective view showing the appearance of the external camera 10A.
Figure 8:
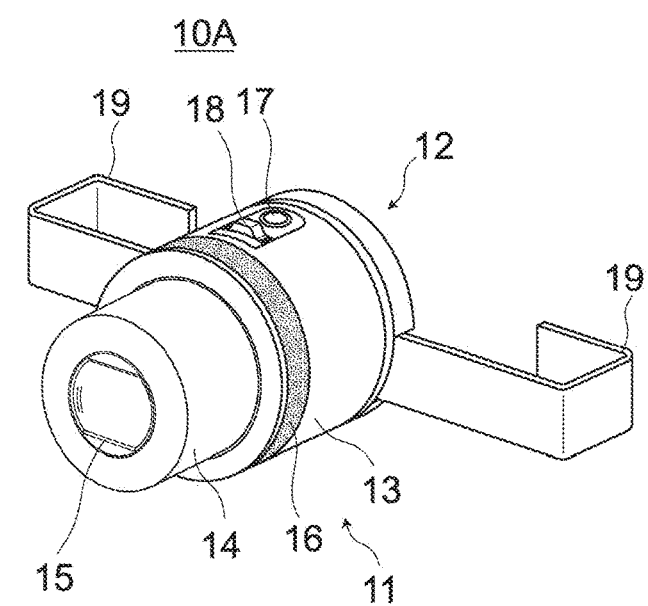
FIG. 8 A perspective view showing the state where the external camera 10A shown in FIG. 7 picks up an image.

FIGS. 7 and 8 are each a perspective view showing the appearance of the external camera 10A.

This external camera 10A includes a camera body 11 and an adaptor 12. The adaptor 12 is attachable/detachable to/from the camera body 11 and an external apparatus (e.g., portable terminal 40A). It should be noted that the camera body 11 and the adaptor 12 may be integrated.

The camera body 11 includes, for example, an external cylindrical portion 13 having a cylindrical shape. In the external cylindrical portion 13, an imaging lens, an image sensor, a circuit for signal processing and image processing, a circuit for control such as a controller and a memory, a power supply unit, storage for storing image data, a wireless communication circuit, and the like are placed.

On the end portion of the front surface of the external cylindrical portion 13, an internal cylindrical portion 14 capable of moving in the front-back direction is supported. As shown in FIG. 8, the internal cylindrical portion 14 is brought to the fore with respect to the external cylindrical portion 13, thereby causing the external camera 10A to be in the imaging state. The internal cylindrical portion 14 brought to the fore is brought to the back and is received by the external cylindrical portion 13, thereby causing the external camera 10A to be in the retracted state (FIG. 7).

On the front surface of the internal cylindrical portion 14, a light transmission hole 15 having a substantially rectangular shape is formed. On the back surface side of the front surface of the internal cylindrical portion 8, lens barriers 9, 9 are openably supported. The lens barriers 9, 9 are closed by an opening/closing mechanism (not shown) in the retracted state, and opened in the imaging state. Therefore, the light transmission hole 15 of the internal cylindrical portion 8 is blocked by the lens barriers 9, 9 (see FIG. 7) in the retracted state, and the light transmission hole 15 is opened by the lens barriers 9, 9 in the imaging state (see FIG. 8).

A plurality of lens groups for imaging are arranged apart from each other in the optical axis direction in the camera body 11, and light enters, from the outside, the lens groups for imaging when the light transmission hole 15 is opened by the lens barriers 9, 9. The light passing through the lens groups for imaging enters the image sensor, and is converted into an electrical signal for each pixel. The electrical signal for each pixel is converted into a digital signal by an A/D converter, and thus image data is obtained through development processing.

On the peripheral surface of the front end portion of the external cylindrical portion 7, an operation ring 16 is rotatably supported. By a turning operation of the operation ring 16, manual focus or zoom is performed and the lens groups are moved toward the optical axis direction.

On the outer peripheral surface of the external cylindrical portion 7, a shutter button 17, a zoom switch 18, and another operation button/switch are provided.

The adaptor 12 includes a pair of locking portions 19, 19 locked to an external apparatus (e.g., portable terminal 40A). The pair of locking portions 19, 19 is capable of expanding and contracting with respect to the adaptor 12, and can be locked at an arbitrary expansion/contraction position.

Since the pair of locking portions 19, 19 is capable of expanding and contracting with respect to the adaptor 12, it is possible to mount this external camera 10A on various parts of an external apparatus having various shapes and sizes.

[Hardware Configuration of External Camera 10A]

Figure 9:
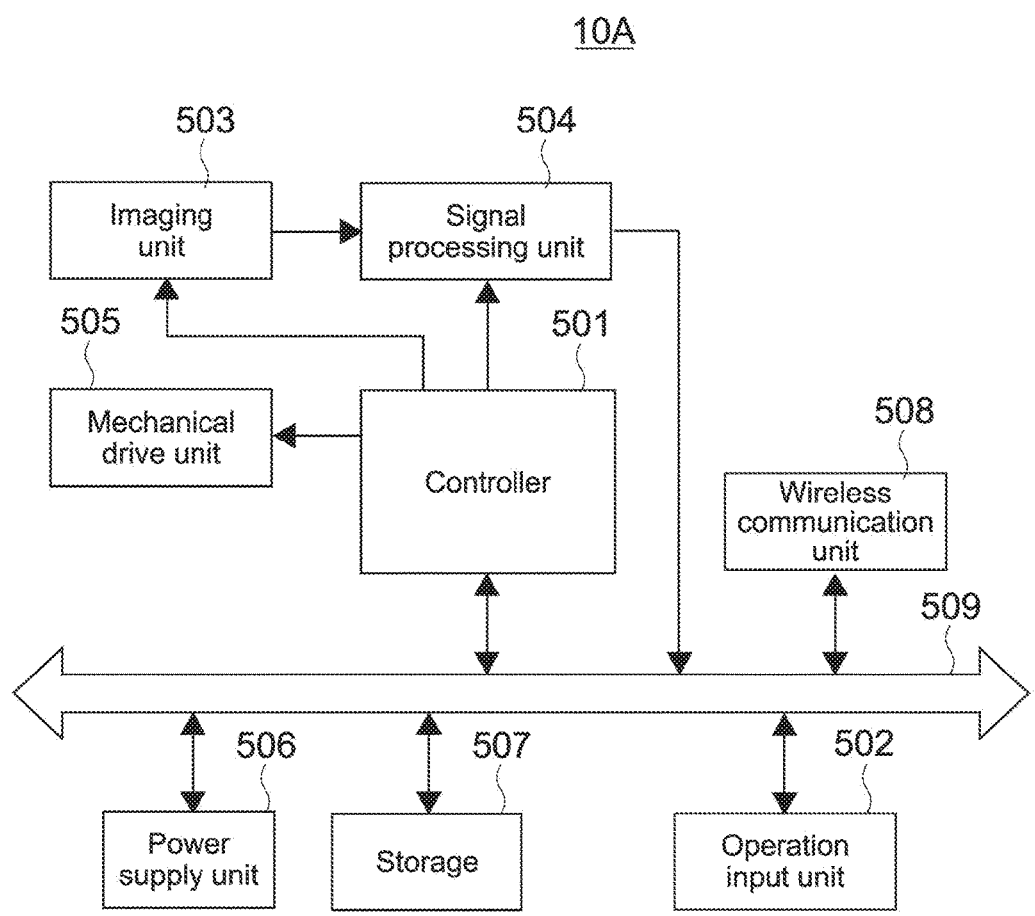
FIG. 9 A block diagram showing the hardware configuration of the external camera 10A shown in FIG. 7.

FIG. 9 is a block diagram showing the hardware configuration of the external camera 10A.

As shown in FIG. 9, this external camera 10A includes a controller 501, an operation input unit 502, an imaging unit 503, a signal processing unit 504, a mechanism drive unit 505, a power supply unit 506, a storage 507, a wireless communication unit 508, and a system bus 509.

The controller 501 controls the respective units of the external camera 10A. The controller 501 includes a CPU and a memory. The memory includes a RAM used as the main memory 402 and a ROM storing a program for turning on/off a power supply, starting imaging, capturing a still image, controlling communication with an external apparatus (e.g., portable terminal 40A), and the like.

When detecting an external apparatus located at a short distance (e.g., portable terminal 40A) by using the wireless communication unit 508, for example, the controller 501 outputs a power supply control signal to the power supply unit 506 and causes the power supply unit 506 to start supplying a power source to the respective units of the external camera 10A. Further, when the power supply to the respective units of the external camera 10A is on and an external apparatus located at a short distance (e.g., portable terminal 40A) is not detected, the controller 501 supplies a power supply control signal to the power supply unit 506 for turning off the power supply to the respective units. Accordingly, the state of the controller 501 returns to an apparatus detection state.

The controller 501 receives various commands from the external apparatus (e.g., portable terminal 40A) connected by using the wireless communication unit 508, and performs processing corresponding to the command. Examples of the instructions from the external apparatus (e.g., portable terminal 40A) include an instruction for starting imaging, cutting of a still image from a moving image being picked up and wireless transmission to, for example, the portable terminal 40A, zoom up/zoom in, and the like.

The operation input unit 502 receives an operation input from the user, and outputs an operation signal to the controller 501.

The imaging unit 503 includes an imaging lens, an image sensor such as a CCD (Charge Coupled Device) and a CMOS (Complementary Metal Oxide Semiconductor), and the like.

The signal processing unit 504 performs adjustment of exposure, white balance, and the like, and development processing, and the like on the A/D converter that converts the output of the imaging unit 503 into a digital signal and the RAW data as the output of the A/D converter. The signal processing unit 504 performs, as necessary, noise reduction, color tone correction, edge detection, and the like.

The storage 507 is used to store a file of picked-up image data. The storage 507 includes, for example a flash memory.

The mechanism drive unit 505 is a circuit that drives mechanisms including, for example, a mechanism that drives a lens group toward the optical axis direction for focus adjustment and zoom change, a mechanism that causes the internal cylindrical portion 14 to expand and contract, and a mechanism that opens/closes the lens barriers 9, 9.

The power supply unit 506 generates electric power necessary for operating the battery and the respective units of the external camera 10A from the battery, and supplies it to the respective units.

The wireless communication unit 508 is an interface for performing communication via a wireless LAN (Local Area Network) such as WiFi (registered trademark) or near field communication such as NFC (Near Field Communication) and Blue Tooth (registered trademark) between the wireless communication unit 508 and an external apparatus (e.g., portable terminal 40A).

In addition, the camera apparatus may include a display, a speaker, a GPS reception unit, a posture sensor, a media read/writer, and the like.

Next, the posture of the portable terminal 40A when it is used will be described.

The shape of the enclosure 41 of the portable terminal 40A is a rectangular parallelepiped, and the size in one axis (Z-axis) direction is particularly small, thereby making the enclosure 41 have a thin rectangular parallelepiped. The two-dimensional space including other two axial (XY-axes) directions is relatively large for arranging the screen of a display 43 thereon. Between a size Lx of the enclosure 41 in the X-axis direction and a size Ly of the enclosure 41 in the Y-axis direction, the following relationship, Lx<Ly, is established. Also, between a size Dx of the screen of a display 43 in the X-axis direction and a size Dy of the screen of a display 43 in the Y-axis direction, the following relationship, Dx<Dy, is established.

In the following description, the posture of the portable terminal 40A with the Y-axis direction as a vertical direction when viewed from the user is referred to as "vertical posture," and the posture of the portable terminal 40A with the X-axis direction as a vertical direction when viewed from the user is referred to as "horizontal posture." Further, the vertical posture includes a posture in which the position of the incorporated camera 20A is higher than that of the screen of a display 43 when viewed from the user (first vertical posture), and a posture in which the position of the incorporated camera 20A is lower than that of the screen of a display 43 when viewed from the user (second vertical posture). Similarly, the horizontal posture includes a posture in which the position of the incorporated camera 20A is on the right side of the screen of a display 43 when viewed from the user (first horizontal posture), and a posture in which the position of the incorporated camera 20A is on the left side of the screen of a display 43 when viewed from the user (second horizontal posture).

The above-mentioned postures of the portable terminal 40A are detected by an incorporated acceleration sensor, an incorporated gyro sensor, and the like, and the orientation of the display data is rotated so that horizontal and vertical orientations when viewed from the user match with horizontal and vertical orientations of the image displayed on the screen of a display 43, for example.

[Operation of Face Image Processing System 1A]

By mounting the external camera 10A on the portable terminal 40A via the adaptor 12, the portable terminal 40A and the external camera 10A detect each other through short-distance wireless communication therebetween, for example.

When detecting the portable terminal 40A, the controller 501 of the external camera 10A instructs the power supply unit 506 to supply electric power to the respective units of the external camera 10A. Accordingly, the camera unit is in a state where an image can be picked up, and waits for a command from the portable terminal 40A.

On the other hand, when detecting the external camera 10A, the CPU 401 of the portable terminal 40A activates the application program for camera. In accordance with the application program for camera, the CPU 401 of the portable terminal 40A activates the incorporated camera 20A and controls the incorporated camera 20A to start imaging. In addition, the CPU 401 of the portable terminal 40A instructs the external camera 10A to start imaging through wireless communication. Accordingly, the incorporated camera 20A and the external camera 10A start imaging.

When the incorporated camera 20A is activated, an image picked up by the incorporated camera 20A is displayed on the screen 43 of the display 404 of the portable terminal 40A as a moving image.

The user determines the position and orientation of the portable terminal 40A so that his/her face is within the viewing field of the incorporated camera 20A of the portable terminal 40A while viewing the screen 43 of the display 404 to take an image of his/her face. When the user operates the shutter button of the incorporated camera 20A, the CPU 401 of the portable terminal 40A stores, in the main memory 402, an image (still image) picked up at the time as a first face image used for the line-of-sight correction.

In addition, the CPU 401 of the portable terminal 40A requests the external camera 10A to cut out a still image from a moving image being picked up and transmit the still image through wireless communication. When receiving the request, the controller 501 cuts out a still image from a moving image being picked up and transmits the still image to the portable terminal 40A through wireless communication. The CPU 401 of the portable terminal 40A stores, in the main memory 402 as a second face image used for the line-of-sight correction, an image (still image) transmitted from the external camera 10A.

After that, the CPU 401 of the portable terminal 40A performs the above-mentioned composition processing for the line-of-sight correction on the two face images stored in the main memory 402, and displays the result on the screen 43 of the display 404.

Note that also in this embodiment, the matching of the image tone between the two face images is performed similarly to that in the first embodiment.

Figure 10:
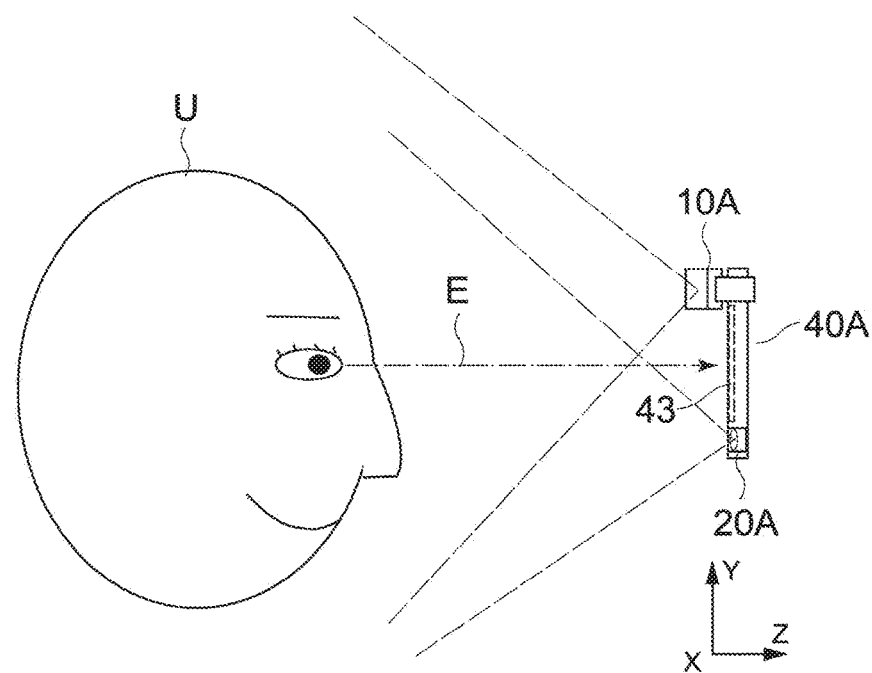
FIG. 10 A diagram showing a first embodiment in which the user U takes an image of his/her face by using the face image processing system 1A shown in FIG. 4.

FIG. 10 is a diagram showing a first embodiment in which the user takes an image of his/her face by using the face image processing system 1A according to this embodiment.

In this first imaging embodiment, assumption is made that the external camera 10A is used as the upper camera apparatus 10 (see FIG. 1) that picks up an image of the face of the user U from a position slightly higher than the position of the line of sight E, and the incorporated camera 20A is used as the lower camera apparatus 20 (see FIG. 1) that picks up an image of the face of the user U from a position slightly lower than the position of the line of sight E.

This is an optimal embodiment for the case where the specification, which affects the degree of image quality of the camera, of the external camera 10A is higher than that of the incorporated camera 20A of the portable terminal 40A and an upward line-of-sight image is composited. Specifically, this is because an image whose image quality is relatively high, which is picked up by the external camera 10A, is used for a large area other than eye part.

Figure 11:
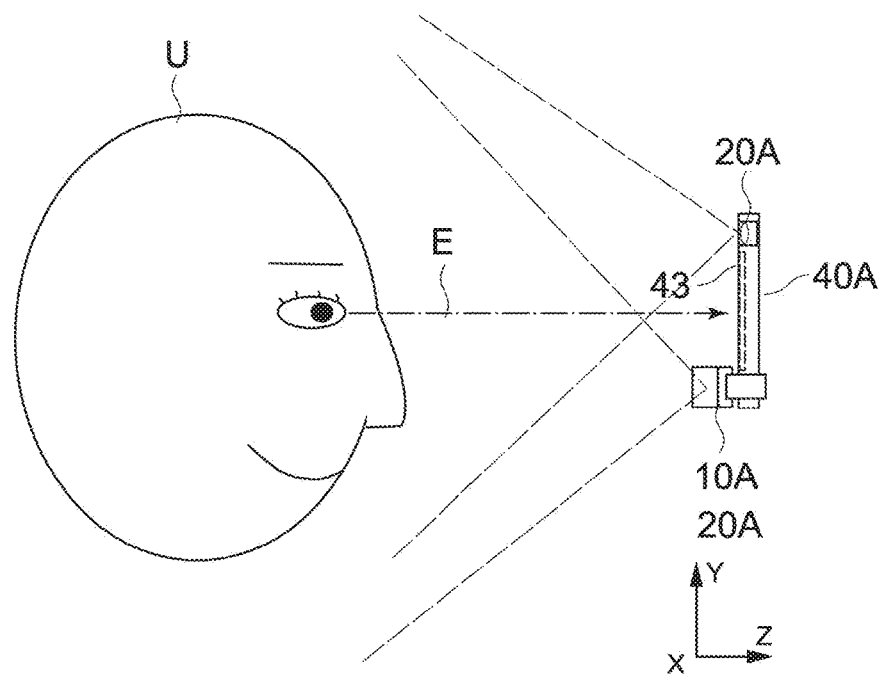
FIG. 11 A diagram showing a second embodiment in which the user U takes an image of his/her face by using the face image processing system 1A shown in FIG. 4.

FIG. 11 is a diagram showing a second embodiment in which the user U takes an image of his/her face by using the face image processing system 1A according to this embodiment.

In this second imaging embodiment, contrary to the first imaging embodiment, assumption is made that the external camera 10A is used as the lower camera apparatus 20 (see FIG. 1) that picks up an image of the face of the user U from a position slightly lower than the position of the line of sight E, and the incorporated camera 20A is used as the upper camera apparatus 10 (see FIG. 1) that picks up an image of the face of the user U from a position slightly higher than the position of the line of sight E.

Since the vertical orientation of the enclosure 41 is detected by the posture sensor 408, the portable terminal 40A is capable of acquiring a composite image on which the line-of-sight correction is performed, by rotating the vertical orientation of images picked up by the incorporated camera 20A of the portable terminal 40A and the external camera 10A.

This is an optimal embodiment for the case where the specification, which affects the degree of image quality of the camera, of the incorporated camera 20A of the portable terminal 40A is higher than that of the external camera 10A and an upward line-of-sight image is composited.

In the above, a method of generating a line-of-sight correction image from the face images of the same user picked up by the two camera apparatuses 10 and 20 has been described.

[Condition Determination of Orientation and Position of Two Cameras]

Incidentally, in order to properly composite a face image on which the upward line-of-sight correction is performed, the orientation and position of the two camera apparatuses need to satisfy at least the following conditions:

Condition 1 the orientation of each camera apparatus is right;

Condition 2 the direction in which the two camera apparatuses are arranged is right with respect to the horizontal and vertical orientations of the face of the user as an object for generating a line-of-sight correction image; and Condition 3 the vertical positional relationship between the incorporated camera 20A and the external camera 10A in the vertical direction of the face of the user as an object is right (in the case of the upward line-of-sight correction, the right positional relationship is that the incorporated camera 20A and the external camera 10A are positioned below and above, respectively).

Figure 12:
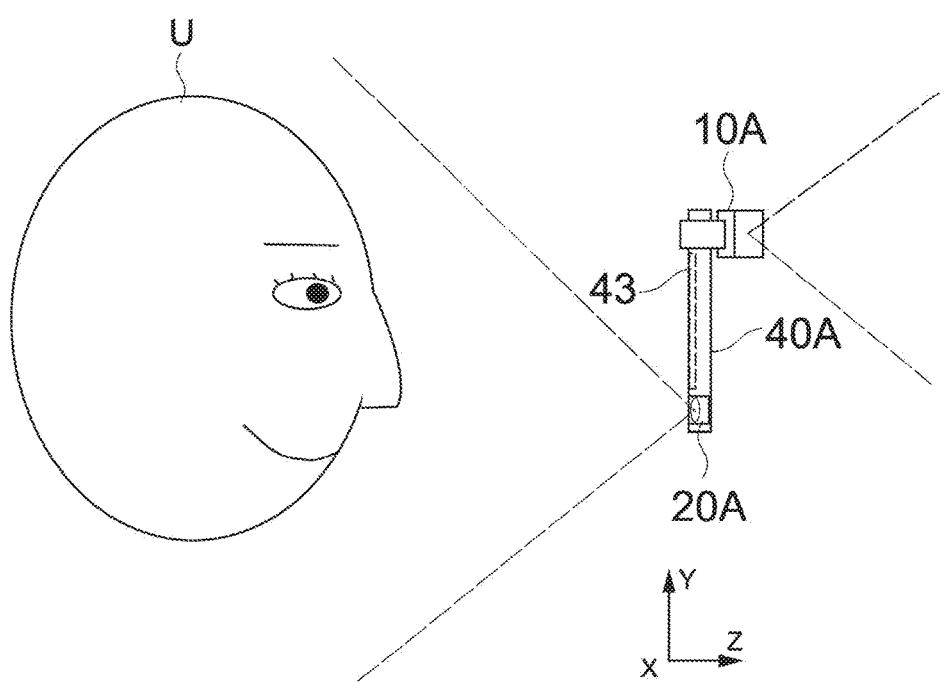
FIG. 12 A diagram showing an example in which image composition for line-of-sight correction fails.

For example, as shown in FIG. 12, in the case where the viewing field of one camera apparatus 10 is in the opposite direction to the user U as an object, a pair of an upward line-of-sight image and a downward line-of-sight image necessary for the line-of-sight correction is not acquired. Therefore, it is difficult to composite a face image on which the line-of-sight correction is performed (condition 1 is not satisfied). Further, in such a case, the camera apparatus 10A in the opposite direction may pick up an image of the face of another person and an unintended composite image on which the line-of-sight correction is performed from the face of the user and the face of another person may be generated.

Figure 13:
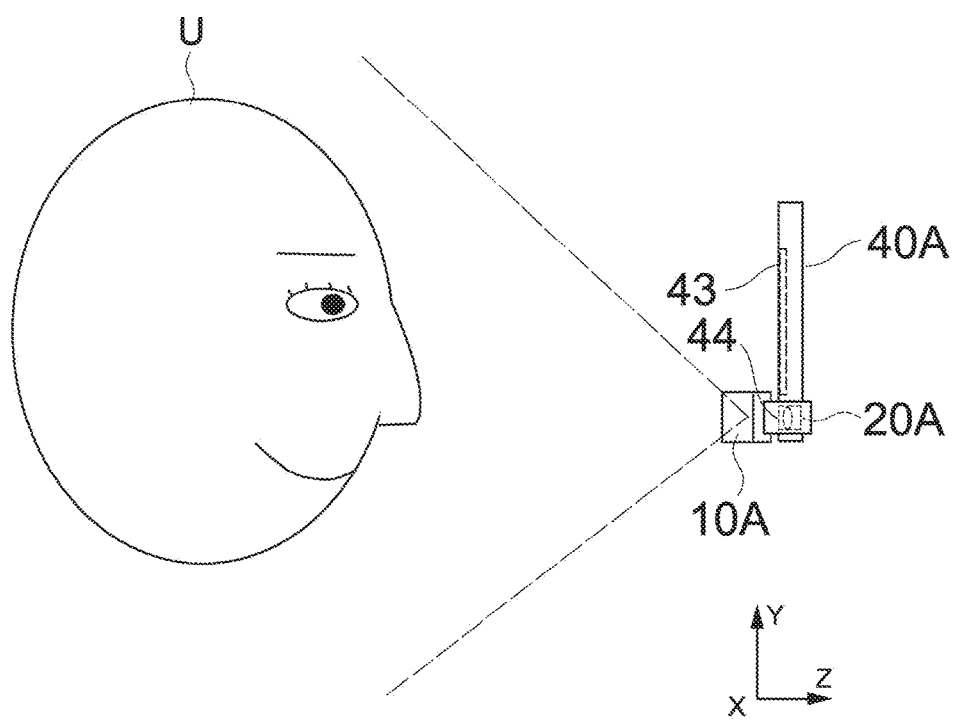
FIG. 13 A diagram showing another example in which image composition for line-of-sight correction fails.
Figure 14:
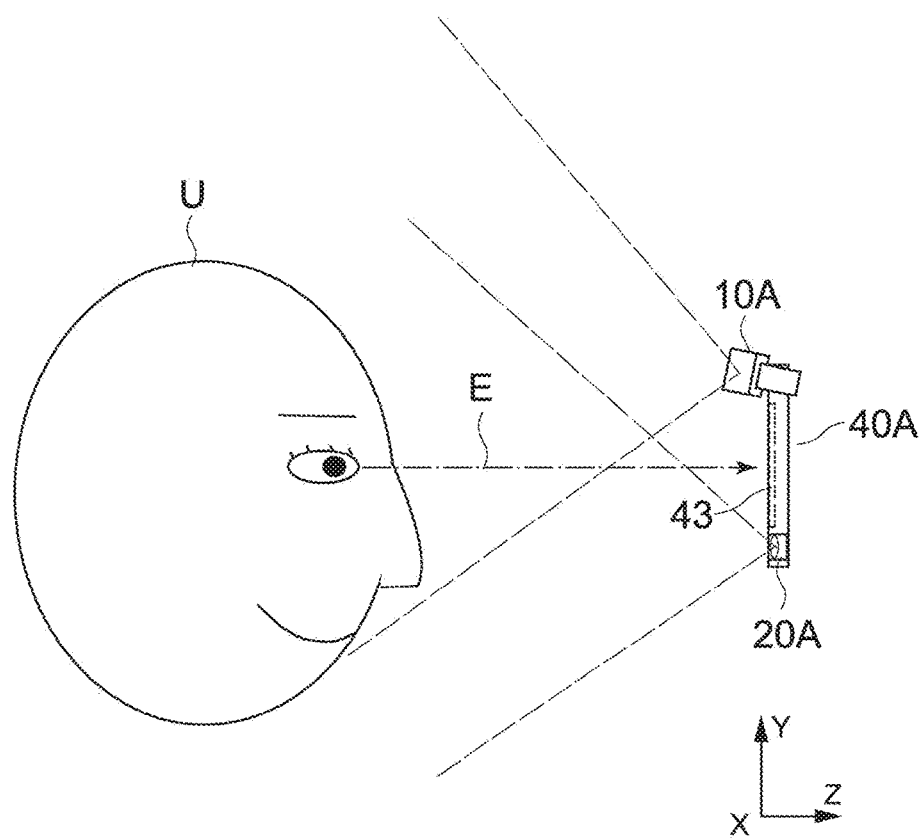
FIG. 14 A diagram showing a still another example in which image composition for line-of-sight correction fails.

Further, also in the case where the light transmission unit 44 (see FIG. 4) of the incorporated camera 20A is blocked by an obstacle such as a finger, the external camera 10A is mounted to block the light transmission unit 44 of the incorporated camera 20A as shown in FIG. 13, or it is difficult to pick up an image of the face of the user which is completely within the viewing angle of the external camera 10A because of insufficient mounting of the external camera 10A as shown in FIG. 14, it is difficult to acquire a face image on which the line-of-sight correction is performed.

Figure 15:
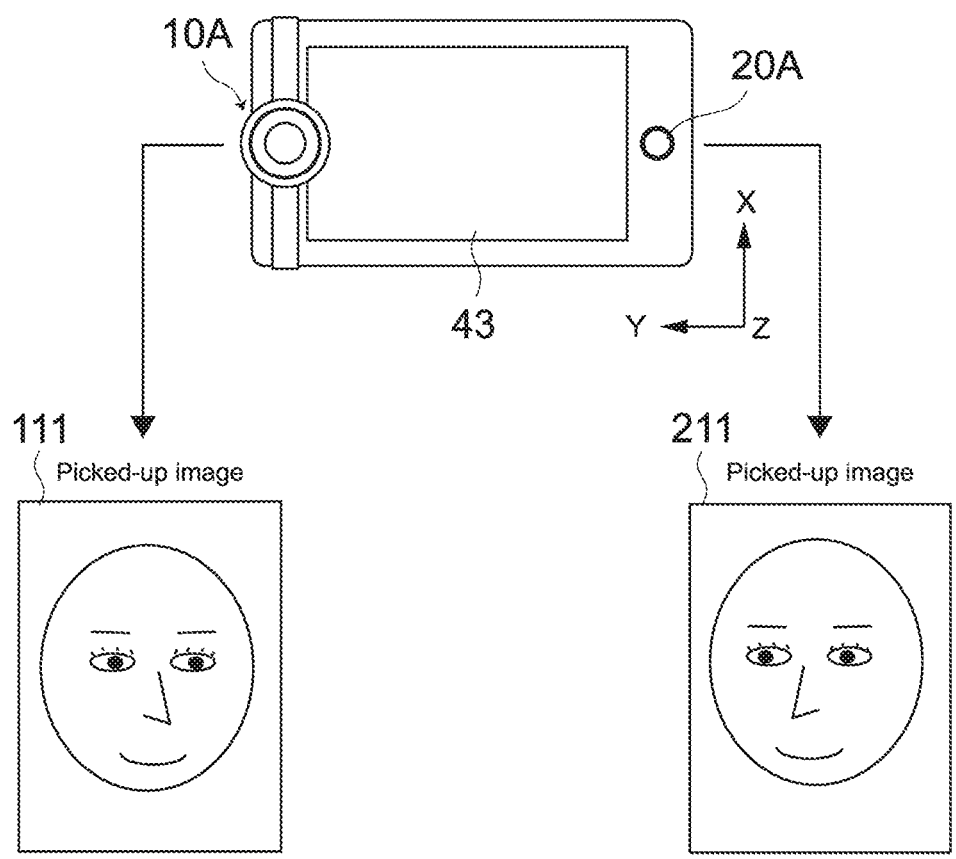
FIG. 15 A diagram showing an example in which image composition for line-of-sight correction fails due to the horizontal posture of the portable terminal 40A.

Further, as shown in FIG. 15, in the case where an image is picked up when orientations of the incorporated camera 20A and the external camera 10A have the horizontal positional relationship with respect to the vertical direction of the face of the user U, only face images 111 and 211 of the user picked up by the incorporated camera 20A and the external camera 10A in which the user looks slightly diagonally to the left and right, respectively, are acquired, even if the picked-up images are rotated in a right direction on the basis of the posture of the portable terminal 40A detected by the posture sensor 408. Therefore, it is difficult to acquire a face image on which the line-of-sight correction is performed.

Figure 16:
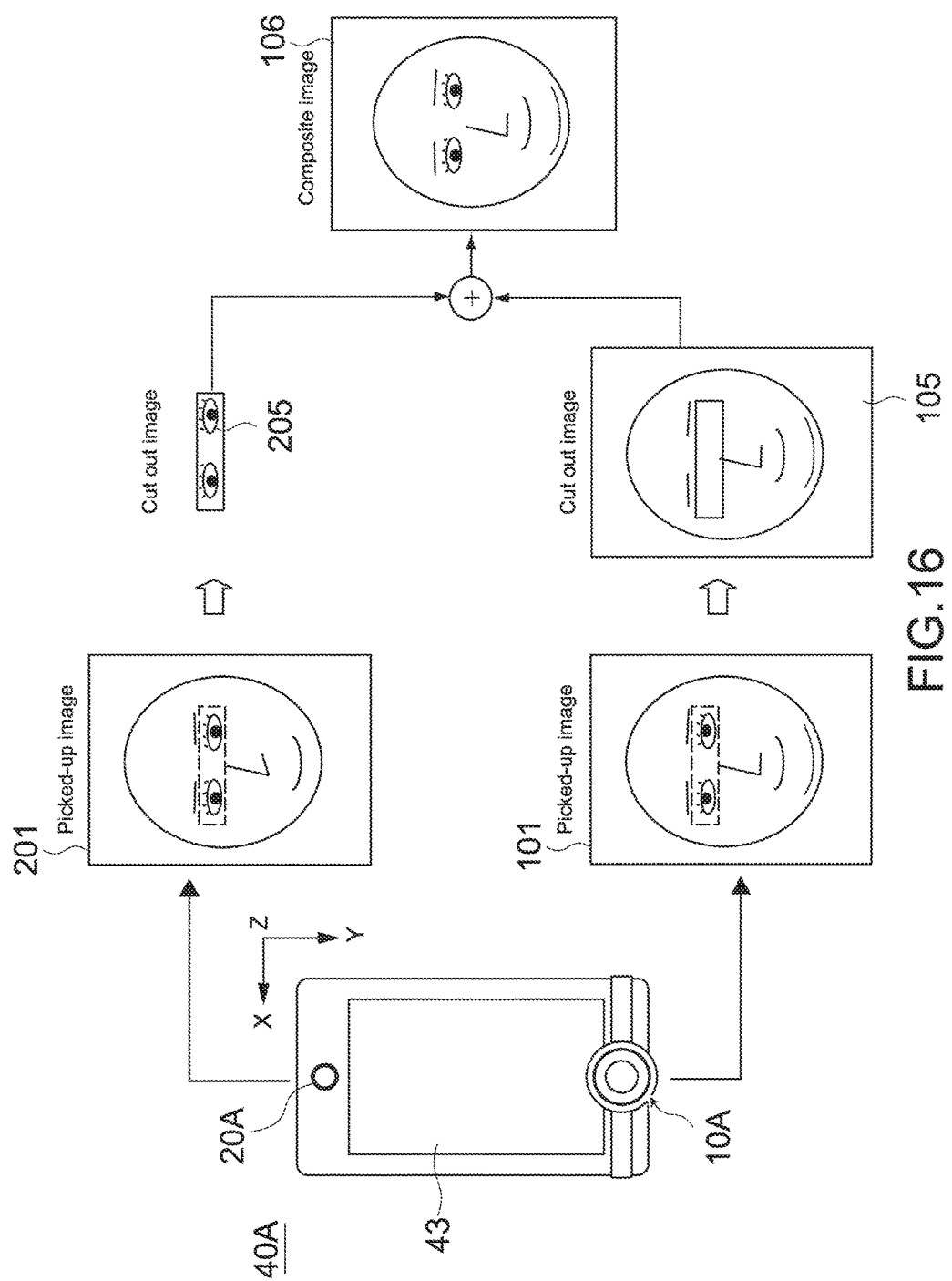
FIG. 16 A diagram showing an example in which image composition for line-of-sight correction fails due to the upside down portable terminal 40A.

Further, as shown in FIG. 16, in the case where an image is picked up when the vertical positional relationship between the incorporated camera 20A and the external camera 10A in the vertical direction of the face of the user is reversed and an upward line-of-sight is desired to be composited, a face image on which the downward line-of-sight correction is performed is composited despite the user's intention (condition 3 is not satisfied).

In view of the above, the portable terminal 40A according to this embodiment has a function of determining whether or not at least the above-mentioned conditions are satisfied on the basis of the images picked up by the incorporated camera 20A and the external camera 10A, and alerting non-satisfaction of the conditions to the user. Hereinafter, this function will be described.

Figure 17:
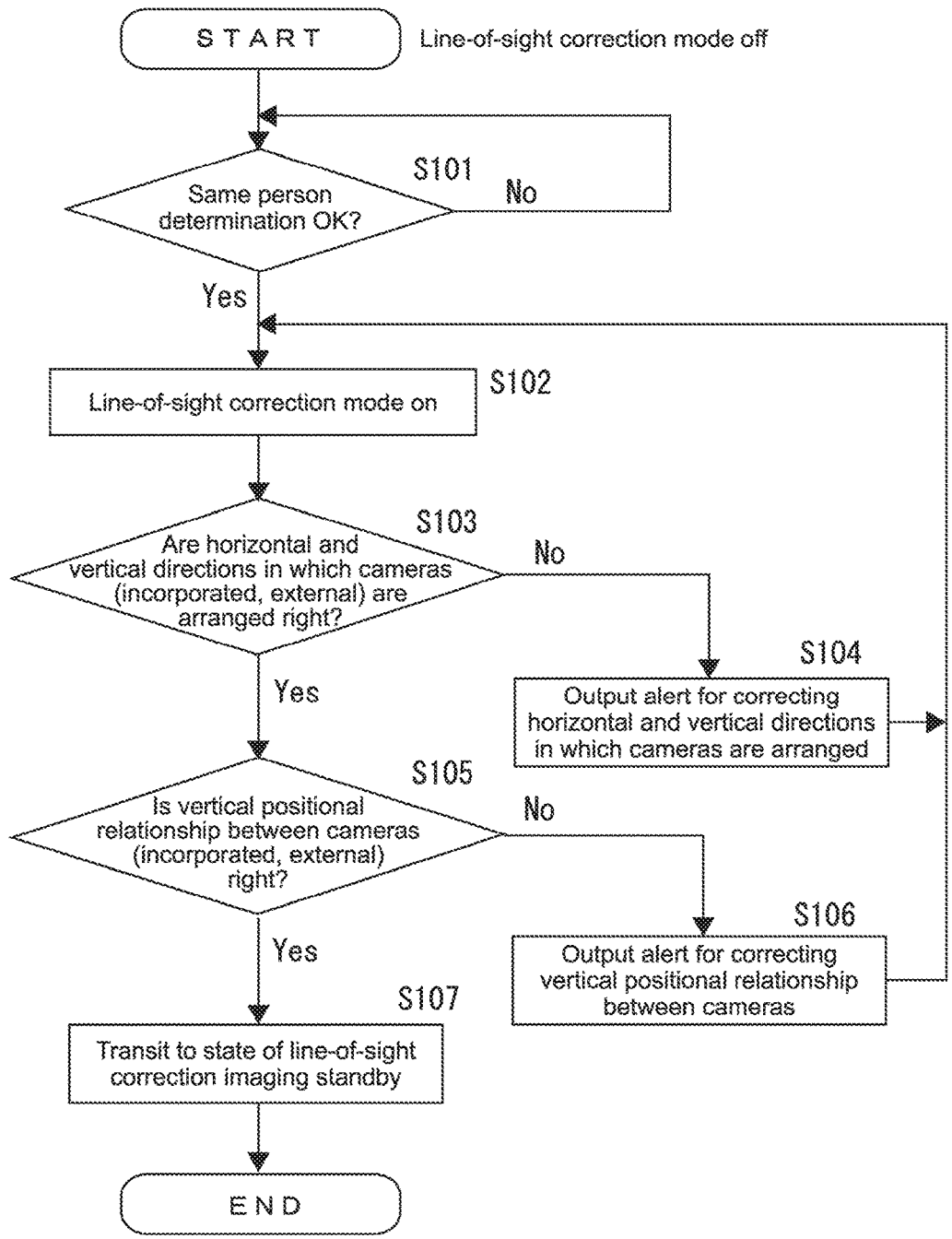
FIG. 17 A flowchart relating to condition determination performed by the portable terminal 40A according to the second embodiment and the alert function.

FIG. 17 is a flowchart relating to the above-mentioned condition determination and the alert function.

Before the operation is described in accordance with this flowchart, various states and modes relating to the line-of-sight correction imaging in the portable terminal 40A will be described.

The state where an image can be actually picked up with the line-of-sight correction in the portable terminal 40A will be referred to as a "line-of-sight correction imaging standby." When it is the line-of-sight correction imaging standby, it is presented to the user via the screen 43 of the display 404, for example, that an image can be picked up with the line-of-sight correction. In the state of the line-of-sight correction imaging standby, in the case where the user operates a shutter button, for example, image composition for the line-of-sight correction is performed using images picked up by the incorporated camera 20A and the external camera 10A.

When it is not in the state of the line-of-sight correction imaging standby, the image composition for the line-of-sight correction is not performed even if the user operates the shutter button. For example, it may be possible to perform only processing of disabling the operation of the shutter button or storing an image picked up by one camera (e.g., incorporated camera 20A) as a still image.

Prior to the state of the line-of-sight correction imaging standby, there is an on/off state of the line-of-sight correction mode. The line-of-sight correction mode is off when the same person is not detected from images picked up by the incorporated camera 20A and the external camera 10A, and on when the same person is detected. When the line-of-sight correction mode is on, the above-mentioned conditions 2 and 3 are determined on the basis of images picked up by the incorporated camera 20A and the external camera 10A, and a corresponding alert is output when any of the conditions is not satisfied.

Next, with reference to the flowchart of FIG. 17, the above-mentioned condition determination and alert operation will be described.

On the screen 43 of the display 404, for example, an image (moving image) picked up by the incorporated camera 20A is displayed in real time. The user U determines the composition while viewing this real-time image (moving image), and waits for it to be the state of the line-of-sight correction imaging standby.

The line-of-sight correction mode is currently in an off-state.

The CPU 401 of the portable terminal 40A determines, from images picked up by the incorporated camera 20A and the external camera 10A, whether or not objects in the images are the same person (Step S101). This same person determination is performed by, for example, determining that it is the same person when an image of the face of a person exists in each image and the difference of the feature amount obtained by digitizing the feature of the face between the images is not more than a threshold value set for determining that it is the same person, and determining that it is not the same person when the difference of the feature amount is larger than the threshold value. Because the person determination on the basis of the feature amount of the face is well-known technology, detailed description thereof will be omitted here.

Note that although whether or not it is the same person is determined here, only whether or not an image of the face of a person who faces substantially front exists in each image may be determined in the case where it is desired that priority is given to the speed.

Further, the CPU 401 of the portable terminal 40A may cause the user to select a desired determination method from a plurality of determination methods divided in stages such as accuracy-oriented, normal, and speed-oriented methods, and perform the same person determination with the selected determination method.

The accuracy-oriented method is a determination method in which the threshold value for the difference of the feature amount for the same person determination is set to a low value. The speed-oriented method is a determination method in which the threshold value for the difference of the feature amount for the same person determination is set to a high value or a determination method in which the same person determination is not performed, only whether or not there is an image of the face is determined, and the determination is OK when an image of the face exists in both images. The normal method is an intermediate determination method of the accuracy-oriented method and the speed-oriented method. For example, the same person determination is performed, and the threshold value for the difference of the feature amount for the same person determination is set to a value higher than that in the accuracy-oriented method and lower than that in the speed-oriented method.

In the same person determination, in the case where the face of the same person is hard to be detected from the images (No in Step S101), the CPU 401 of the portable terminal 40A maintains the line-of-sight correction mode in the off-state. Therefore, also after that the same person determination from images picked up by the incorporated camera 20A and the external camera 10A is repeated.

Specific examples of cases where the face of the same person is hard to be detected from the images include the case where the external camera 10A is erroneously mounted in the opposite direction as shown in FIG. 12. In such a case, the face of the user U is detected from an image picked up by the incorporated camera 20A, but an image picked up by the external camera 10A includes only an image of landscape viewed by the user over the portable terminal 40A, for example. Therefore, the face of the same person is not detected in the images, and the determination result of the same person is determined to be NG.

Further, in the same person determination, in the case where the face of the same person is detected from the images (Yes in Step S101), the CPU 401 of the portable terminal 40A turns on the line-of-sight correction mode (Step S102). When the line-of-sight correction mode is turned on, the CPU 401 of the portable terminal 40A starts processing for determining satisfaction/non-satisfaction of the above-mentioned conditions 2 and 3 on the basis of an image picked up by at least one of the incorporated camera 20A and the external camera 10A, and the posture of the portable terminal 40A detected by the posture sensor 408, for example.

The determination processing of the condition 2 is performed as follows, for example.

The CPU 401 of the portable terminal 40A determines whether or not the direction in which the two camera apparatuses are arranged is right with respect to the horizontal and vertical orientations of the face of the user as an object for generating the line-of-sight correction image (Step S103). More specifically, for example, as shown in FIG. 2, the faces in the images 101 and 201 picked up by the external camera 10A (first camera apparatus 10) and the incorporated camera 20A (second camera apparatus 20), respectively, are inclined in the upward and downward directions in the vertical direction of the face of the user. In the case where they are inclined in the upward and downward directions, the determination result of the condition 2 is determined to be OK. Otherwise, it is determined to be NG. Alternatively, whether or not the faces in the images 101 and 201 are inclined in separate directions of the upward direction and the downward direction may be determined. Alternatively, it may only need to determine whether or not the face in the image picked up by one of the cameras is inclined in the upward or downward direction.

The determination of whether or not the faces in the images are inclined in separate directions of the upward and downward directions in the vertical direction of the face of the user can be performed with various known or well-known methods such as a comparison between the positions of parts of the faces in the vertical direction of the faces in the images and a comparison between the positions of the faces in the viewing angle in the upward and downward directions.

Further, in addition to the determination of whether or not the faces in the images are inclined in separate directions of the upward and downward directions in the vertical direction of the face of the user, determination of whether or not the faces are inclined in separate directions of left and right directions may be performed. Specifically, the determination result of the condition 2 is determined to be OK when the faces in the images are inclined in at least separate directions of the upward and downward directions, and determined to be NG when the faces are inclined only in separated directions of the left and right directions. In other cases, it may be determined to be an error.

Figure 18:
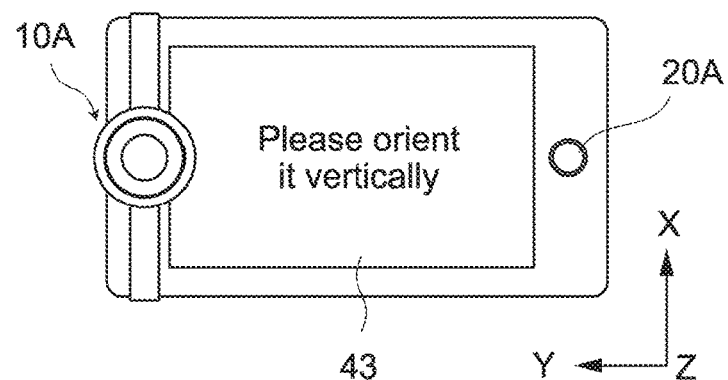
FIG. 18 A diagram showing an example of the alert in the case where the direction in which the two camera apparatuses are arranged is wrong.
Figure 19:
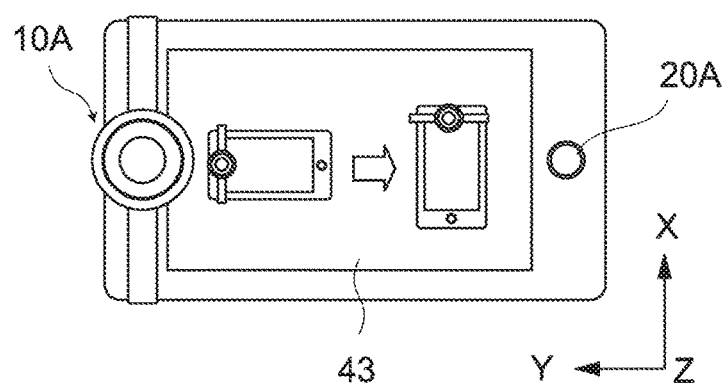
FIG. 19 A diagram showing another example of the alert in the case where the direction in which the two camera apparatuses are arranged is wrong.

In the case where the determination result of the condition 2 is NG (No in Step S103), the CPU 401 of the portable terminal 40A outputs an alert (Step S104). Examples of the alert include a method of displaying a message such as "please orient it vertically" on the screen 43 of the display 404 as shown in FIG. 18, and a method of displaying graphics data (still image, moving image) that guides the user to vertically orient the portable terminal 40A on the screen 43 of the display 404 as shown in FIG. 19. Alternatively, it is also possible to guide the user by sound.

Note that although the determination of the condition 2 is performed from the picked-up image here, for example, in the case where an image-pickup is limited so that the vertical orientation of the face matches with the gravity direction, the determination result of the condition 2 may be determined to be OK when the vertical posture is detected by the posture sensor 408 and the determination result of the condition 2 may be determined to be NG when the horizontal posture is detected.

The determination processing of the condition 3 is performed as follows, for example.

Here, assumption is made that the upward line-of-sight correction is designated by the user.

As shown in FIG. 10, the CPU 401 of the portable terminal 40A determines whether or not the vertical positional relationship between the incorporated camera 20A and the external camera 10A in the vertical direction of the face of the user U as an object is right (Step S105).

Here, the right vertical orientation of the portable terminal 40A when the upward line-of-sight correction is performed is an orientation when a camera whose image quality is high is positioned relatively above and a camera whose image quality is low is positioned relatively below in the vertical direction of the face of the user U as an object as shown in FIG. 10. This is because in the upward line-of-sight correction, an image of a large area other than the eye part in the face image picked up by the upper camera apparatus is used for composition. When assumption is made that the image quality of an image picked up by the external camera 10A is higher than that of the incorporated camera 20A, the orientation of the portable terminal 40A when the external camera 10A is positioned relatively above and the incorporated camera 20A is positioned relatively below is the right vertical orientation of the portable terminal 40A when the upward line-of-sight correction is performed.

The determination of whether or not the vertical positional relationship between the incorporated camera 20A and the external camera 10A in the vertical direction of the face of the user U as an object is right is performed by individually determining that the face of the user looks slightly down in an image picked up by the external camera 10A and the face of the user looks slightly up in an image picked up by the incorporated camera 20A, for example. Alternatively, only whether or not the face of the user looks slightly down in an image picked up by the external camera 10A may be determined. On the contrary, only whether or not the face of the user slightly looks up in an image picked up by the incorporated camera 20A may be determined.

Note that although the determination of the condition 3 is performed from the picked-up image here, for example, in the case where an image-pickup is limited so that the vertical orientation of the face matches with the gravity direction, the CPU 401 may detect the vertical posture in which any of the incorporated camera 20A and the external camera 10A is positioned on the lower side in the weight direction on the basis of the output of the posture sensor 408, and the determination result of the condition 3 may be determined to be OK when it is the vertical posture in which the incorporated camera 20A is on the weight direction side, and determined to be NG when it is the vertical posture in which the external camera 10A is on the weight direction side.

Figure 20:
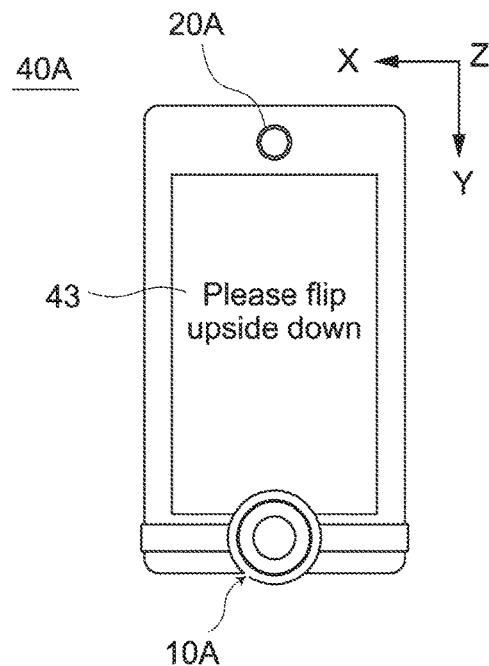
FIG. 20 A diagram showing an example of the alert in the case where the vertical positional relationship between the two camera apparatuses is wrong.
Figure 21:
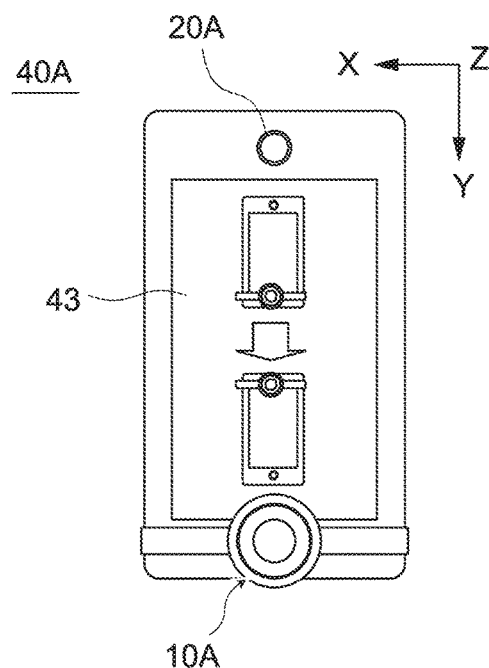
FIG. 21 A diagram showing another example of the alert in the case where the vertical positional relationship between the two camera apparatuses is wrong.

When the CPU 401 of the portable terminal 40A determines that the vertical positional relationship between the incorporated camera 20A and the external camera 10A in the vertical direction of the face of the user U as an object is wrong (No in Step S105), it outputs an alert (Step S106). Examples of the alert in this case include a method of displaying a message such as "please flip upside down" on the screen 43 of the display 404 as shown in FIG. 20 and a method of displaying graphics data (still image, moving image) that guides the user to flip upside down on the screen 43 of the display 404 as shown in FIG. 21. Alternatively, it is also possible to guide the user by sound.

In the case where the above-mentioned conditions (2) and (3) are determined to be OK in each determination processing when the line-of-sight correction mode is on, it becomes the state of the line-of-sight correction imaging standby (Step S107).

When it becomes the state of the line-of-sight correction imaging standby, it is presented to the user via the screen 43 of the display 404, for example, that the line-of-sight correction imaging can be performed. In the case where the user operates the shutter button, for example, in the state of the line-of-sight correction imaging standby, image composition for the line-of-sight correction is performed using images picked up by the incorporated camera 20A and the external camera 10A.

Note that after the output of the alert in the above-mentioned Step S104, the on-state of the line-of-sight correction mode is maintained. Specifically, the state of the alert output in Step S104 is maintained until the user actually corrects the horizontal and vertical orientations of the posture of the portable terminal 40A and this is determined in Step S103.

Similarly, also after the alert output in Step S106, the state of the alert output in Step S106 is maintained until the user actually corrects the vertical orientation of the portable terminal 40A and this is determined in Step S105.

[Other Determination and Alert Output]

In the case where the brightness of one of the two images picked up by the external camera 10A and the incorporated camera 20A is extremely low or the average value of the brightness of the two images is more than a predetermined value, the light transmission unit 44 (see, FIG. 4) of the camera that picks up one image whose brightness is lower than that of the other may be blocked by an obstacle such as a finger. In such a case, the CPU 401 of the portable terminal 40A displays a message such as "camera is blocked" or graphics on the screen 43 of the display 404 or presents it to the user by sound.

MODIFIED EXAMPLE 1

In the above-mentioned embodiment, the above-mentioned determination of the condition 1 is included in the same person determination, and an alert is not output in the case of non-establishment of the condition 1. The determination step of the condition 1 may be separated from the same person determination, and an alert may be output also in the case of non-establishment of the condition 1.

For example, in the case where a face can be detected from the image picked up by the external camera 10A and a face cannot be detected from the image picked up by the incorporated camera 20A, the state where the light transmission unit 44 (see FIG. 4) of the incorporated camera 20A is blocked by an obstacle such as a finger or the case where the external camera 10A is mounted to block the light transmission unit 44 of the incorporated camera 20A as shown in FIG. 13 is assumed. In this regard, in response to such a detection result, the CPU 401 of the portable terminal 40A may display a message such as "please remove obstacle on camera" or graphics on the screen 43 of the display 404 or notify the user of an alert by sound.

On the contrary, in the case where a face is detected from the image picked up by the incorporated camera 20A and a face or a part thereof is not detected from the image picked up by the external camera 10A, there is a possibility that the external camera 10A is mounted back to front (see FIG. 12) or mounted in an incomplete state (see FIG. 14). In such a case, the CPU 401 of the portable terminal 40A may display a message such as "please mount external camera correctly" or graphics on the screen 43 of the display 404 or notify the user of an alert by sound.

MODIFIED EXAMPLE 2

In the line-of-sight correction described above, it is also possible to perform processing designated by the user on the composite face image at the same time. For example, it only needs to allow the user to select the content of image editing such as processing for enlarging an eye or pupil and beautiful skin processing as an option of the line-of-sight correction. The CPU 401 of the portable terminal 40A performs the above-mentioned image editing on the composite face image in accordance with the selected option of the line-of-sight correction.

MODIFIED EXAMPLE 3

The line-of-sight correction may be performed in a CPU of a server apparatus on a network. Specifically, two face images picked up by the two camera apparatuses are transmitted from the information processing apparatus to the server apparatus via the network. The CPU of the server apparatus is configured to perform the above-mentioned line-of-sight correction on the two received face image, and send back a composite image to the information processing apparatus through the network.

MODIFIED EXAMPLE 4

The image transmitted from the external camera 10A to the portable terminal 40A may be RAW data. By performing development processing in the portable terminal 40A, it is possible to use an external camera provided with no development processing unit.

MODIFIED EXAMPLE 5

In the above-mentioned embodiment, two camera apparatuses are used. However, one camera apparatus may be moved to the vertical direction of the face of the user to pick up an image of the face of the user at upper and lower positions a total of two times. Therefore, in the present technology, the number of cameras may be one.

MODIFIED EXAMPLE 6

In the above-mentioned embodiment, image composition for the line-of-sight correction is performed by the information processing apparatus 40 or the CPU of the portable terminal 40A. However, the processing may be distributed and performed in an information processing system including a plurality of information processing apparatuses. Alternatively, the processing may be distributed and performed in an information processing system including one or more information processing apparatuses and a server apparatuses connected thereto via a network. Alternatively, the processing may be distributed and performed in an information processing system including a plurality of server apparatuses connected to each other via a network.

MODIFIED EXAMPLE 7

In the above, the line-of-sight correction of a still image has been described. However, the present technology is applicable also to the line-of-sight correction of a moving image similarly. Specifically, for example, it only needs to perform image composition for the line-of-sight correction of a still image in units of frames or 1/N frames.

In this case, the user holds the portable terminal 40A by his/her hand to cause his/her face to be within the viewing angle of the two cameras. Therefore, due to camera shake or the like, the face is outside or partially outside the viewing angle of the two cameras in some cases.

In the modified example 7, in the case where the face is outside or partially outside the viewing angle of the two cameras and image composition for the line-of-sight correction fails, the information processing apparatus 40 or the CPU 401 of the portable terminal 40A interpolates the frame or 1/N frame that has failed in image composition with the line-of-sight correction image that has finally succeeded in composition. Accordingly, it is possible to display, without interruption, moving images on which the line-of-sight correction has been performed.

MODIFIED EXAMPLE 8

The present technology is applicable also to the case where three or more cameras are connected to each other.

For example, as shown in FIG. 22, assumption is made that the two cameras 10A and 20A with a viewing field of the front of the portable terminal 40A (side of a user U1) are arranged above and below in the vertical direction while two cameras 10B and 20B with a viewing field of the back of the portable terminal 40A are arranged above and below in the vertical direction.

In this case, as shown in FIG. 22, the two cameras 10A and 20A with a viewing field of the front of the portable terminal 40A (side of the user U1) are used for imaging to generate a his/her line-of-sight correction image. The two cameras 10B and 20B with a viewing field of the back of the portable terminal 40A are used for imaging to generate a line-of-sight correction image of the face of a person U2 who is on the opposite side from the user U1 sandwiching the position of the portable terminal 40A therebetween.

The CPU 401 of the portable terminal 40A detects a face from images picked up by the four cameras 10A, 20A, 10B, and 20B, and performs image composition for the line-of-sight correction on the basis of a pair of images including the face of the same person. Accordingly, it is possible to acquire not only the face image on which the line-of-sight correction of the user U1 himself/herself has been performed but also the face image on which the line-of-sight correction of the other person U2 has been performed. Further, in the case where the face of the same person (person U2) is detected from only a pair of images picked up by the two cameras 10B and 20B with a viewing field of the back of the portable terminal 40A, it is possible to composite and acquire only a face image of the person U2 on which the line-of-sight correction has been performed.

It should be noted that the present technology may take the following configurations.

(1) An information processing apparatus, including
    a control unit that determines, on the basis of two images including a face of a person, whether or not each face in the two images is a face of the same person, the two images being picked up from different positions, and generates, on the basis of an image of an eye part in one of the two images, a line-of-sight correction image obtained by modifying an image of an eye part of the other of the two images when each face in the two images is the face of the same person.

(2) The information processing apparatus according to (1) above, in which
    the control unit is configured to acquire two images including a face of a user as the object, the two images being picked up from different positions in a vertical direction of the face of the user by a first imaging unit and a second imaging unit.

(3) The information processing apparatus according to (2) above, in which
    the control unit is configured
        to determine, in a mode in which the line-of-sight correction image is generated, whether or not a direction in which the first imaging unit and the second imaging unit are arranged is right with respect to horizontal and vertical orientations of the face of the user as the object, and
        to output an alert when the direction is wrong.

(4) The information processing apparatus according to (3) above, in which
    the control unit is configured to output, as the alert, information for leading to correction of the direction in which the first imaging unit and the second imaging unit are arranged.

(5) The information processing apparatus according to any one of (1) to (4) above, in which
    the first imaging unit is an upper imaging unit in the vertical direction of the face of the user as the object, and the second imaging unit is a lower imaging unit in the vertical direction of the face of the user as the object, and
    image quality of an image picked up by the first imaging unit is higher than that of the second imaging unit.

(6) The information processing apparatus according to (5) above, in which the control unit is configured
to determine whether or not a vertical positional relationship between the first imaging unit and the second imaging unit in the vertical direction of the face of the user as the object is right in a mode in which the line-of-sight correction image is generated, and
to output an alert when the vertical positional relationship is wrong.

(7) The information processing apparatus according to (6) above, in which
the control unit is configured to output, as the alert, information for leading to correction of the vertical positional relationship between the first imaging unit and the second imaging unit.

(8) The information processing apparatus according to any one of (1) to (7) above, in which
the control unit is configured to output, as the alert, information for leading to correction of the vertical positional relationship between the first imaging unit and the second imaging unit.

(9) The information processing apparatus according to (1) above, in which
the control unit is configured to edit the generated line-of-sight correction image.

DESCRIPTION OF REFERENCE NUMERALS 1 face image processing system, 1A face image processing system, 10 upper camera apparatus, 10A external camera, 20 lower camera apparatus, 20A incorporated camera, 40 information processing apparatus (information processing system), 40A portable terminal, 401 CPU, 404 display, 409 wireless communication unit, 501 controller, 503 imaging unit, 508 wireless communication unit

The invention claimed is:

1. An information processing apparatus, comprising:
a central processing unit (CPU) configured to:
determine a first face in a first image and a second face in a second image are of a same user, wherein
the first image is captured by a first imaging device from a first position,
the second image is captured by a second imaging device from a second position, and
the first position is different from the second position;
determine, based on the determination that the first face and the second face are of the same user, a direction in which the first imaging device and the second imaging device are arranged is along one of a horizontal orientation of a user face or a vertical orientation of the user face; and
replace, based on the determination that the direction is along the one of the horizontal orientation of the user face or the vertical orientation of the user face, an eye part of the first image with an eye part of the second image to generate a line-of-sight correction image.

2. The information processing apparatus according to claim 1, wherein
the CPU is further configured to acquire, each of the first image that includes the first face and the second image that includes the second face, as an object, and
the first position and the second position are in a vertical direction of the user face.

3. The information processing apparatus according to claim 1, wherein the CPU is further configured to
output an alert based on the determination that the direction is along other than one of the horizontal orientation of the user face or the vertical orientation of the user face.

4. The information processing apparatus according to claim 3, wherein the CPU is further configured to output, as the alert, information for correction of the direction in which the first imaging device and the second imaging device are arranged.

5. The information processing apparatus according to claim 2, wherein
the first imaging device is an upper imaging device in the vertical direction of the user face as the object, and the second imaging device is a lower imaging device in the vertical direction of the user face as the object, and
an image quality of the first image captured by the first imaging device is higher than an image quality of the second image captured by the second imaging device.

6. The information processing apparatus according to claim 5,
wherein the CPU is further configured to:
determine, in a mode in which the line-of-sight correction image is generated, whether a vertical positional relationship between the first imaging device and the second imaging device in the vertical direction of the user face as the object is that the first imaging device is above the second imaging device, and
output an alert based on the vertical positional relationship being other than that the first imaging device is above the second imaging device.

7. The information processing apparatus according to claim 6,
wherein the CPU is further configured to output, as the alert, information for correction of the vertical positional relationship between the first imaging device and the second imaging device.

8. The information processing apparatus according to claim 2, wherein the first imaging device is in the information processing apparatus, and the second imaging device is a separate imaging device detachably mounted on the information processing apparatus.

9. The information processing apparatus according to claim 1, wherein the CPU is further configured to edit the generated line-of-sight correction image.

10. An information processing apparatus, comprising:
a first imaging device configured to capture a first image from a first position;
a second imaging device configured to capture a second image from a second position, wherein the first position is different from the second position; and
a central processing unit (CPU) configured to:
determine a first face in the first image and a second face in the second image are of a same user;
determine, based on the determination that the first face and the second face are of the same user, a direction in which the first imaging device and the second imaging device are arranged is along one of a horizontal orientation of a user face or a vertical orientation of the user face; and
replace, based on the determination that the direction is along the one of the horizontal orientation of the user face or the vertical orientation of the user face, an eye part of the first image with an eye part of the second image to generate a line-of-sight correction image.

11. An information processing method, comprising:
in an information processing apparatus:

determining a first face in a first image and a second face in a second image are of a same user, wherein the first image is captured by a first imaging device from a first position,
    the second image is captured by a second imaging device from a second position, and
    the first position is different from the second position;
determining, based on the determination that the first face and the second face are of the same user, a direction in which the first imaging device and the second imaging device are arranged is along one of a horizontal orientation of a user face or a vertical orientation of the user face; and
replacing, based on the determination that the direction is along the one of the horizontal orientation of the user face or the vertical orientation of the user face, an eye part of the first image with an eye part of the second image to generate a line-of-sight correction image.

12. An information processing system, comprising:
a central processing unit (CPU) configured to:
    determine a first face in a first image and a second face in a second image are of a same user, wherein
        the first image is captured by a first imaging device from a first position,
        the second image is captured by a second imaging device from a second position, and
        the first position is different from the second position;
    determine, based on the determination that the first face and the second face are of the same user, a direction in which the first imaging device and the second imaging device are arranged is along one of a horizontal orientation of a user face or a vertical orientation of the user face; and
    replace, based on the determination that the direction is along the one of the horizontal orientation of the user face or the vertical orientation of the user face, an eye part of the first image with an eye part of the second image to generate a line-of-sight correction image.

13. A non-transitory computer-readable medium having stored thereon computer-executable instructions, which when executed by a processor of an information processing apparatus, cause the information processing apparatus to execute operations, the operations comprising:
    determining a first face in a first image and a second face in a second image are of a same user, wherein
    the first image is captured by a first imaging device from a first position,
    the second image is captured by a second imaging device from a second position, and
    the first position is different from the second position;
    determining, based on the determination that the first face and the second face are of the same user, a direction in which the first imaging device and the second imaging device are arranged is along one of a horizontal orientation of a user face or a vertical orientation of the user face; and
replacing, based on the determination that the direction is along the one of the horizontal orientation of the user face or the vertical orientation of the user face, an eye part of the first image with an eye part of the second image to generate a line-of-sight correction image.

* * * * *